United States Patent
Mattes et al.

(10) Patent No.: US 6,308,554 B1
(45) Date of Patent: Oct. 30, 2001

(54) ELECTRONIC DEVICE HAVING AN ACCELERATION-SENSITIVE SENSOR

(75) Inventors: Bernhard Mattes, Sachsenheim; Lothar Gademann, Rottenburg; Werner Nitschke, Ditzingen; Dietrich Bergfried, Böblingen; Gerald Hopf; Botho Ziegenbein, both of Reutlingen; Klaus Meder, Ditzingen; Ralf Henne, Sachsenheim; Thomas Walker, Kusterdingen; Bernd Maihoefer, Reutlingen; Frank Kursawe, Stuttgart; Peter Schaedler, Ludwigsburg, all of (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 08/952,000

(22) Filed: Oct. 16, 1997

Related U.S. Application Data

(62) Division of application No. 08/545,858, filed on Feb. 26, 1996, now abandoned.

(30) Foreign Application Priority Data

Mar. 12, 1994 (DE) .................................................. 44 08 383
Nov. 8, 1994 (DE) .................................................. 44 39 886

(51) Int. Cl.[7] .................................................. G01P 21/00
(52) U.S. Cl. .................................................. 73/1.37
(58) Field of Search .................................. 73/1.37, 1.38, 73/1.39, 1.41

(56) References Cited

U.S. PATENT DOCUMENTS

| | | |
|---|---|---|
| 2,873,426 | 2/1959 | Dranetz . |
| 3,120,622 | 2/1964 | Dranetz et al. . |
| 3,830,091 | 8/1974 | Sinsky . |
| 4,015,202 | 3/1977 | Fredriksson et al. . |
| 5,070,843 | 12/1991 | Komorasaki . |
| 5,373,722 | 12/1994 | Spies et al. . |
| 5,375,468 * | 12/1994 | Ohta et al. .............................. 73/1.38 |
| 5,377,523 * | 1/1995 | Ohta et al. .............................. 73/1.38 |
| 5,457,982 * | 10/1995 | Spies et al. ........................... 73/1.38 |
| 5,583,290 | 12/1996 | Lewis . |
| 5,734,087 * | 3/1998 | Yamashita ............................. 73/1.38 |
| 5,737,961 * | 4/1998 | Hanisko et al. ...................... 73/1.38 |
| 5,753,793 * | 5/1998 | Lindahl et al. ....................... 73/1.38 |

FOREIGN PATENT DOCUMENTS

| | | |
|---|---|---|
| 35 42 397 | 6/1987 | (DE) . |
| 37 06 765 | 9/1988 | (DE) . |
| 37 36 294 | 5/1989 | (DE) . |
| 38 09 299 | 9/1989 | (DE) . |
| 0 525 549 | 2/1993 | (EP) . |
| WO 89/03999 | 5/1989 | (WO) . |

* cited by examiner

*Primary Examiner*—Hezron Williams
*Assistant Examiner*—Nashmiya Fayyaz
(74) *Attorney, Agent, or Firm*—Kenyon & Kenyon

(57) ABSTRACT

An electronic device includes a resonant circuit and an evaluation circuit. The resonant circuit includes an acceleration-sensitive sensor which is excited to vibrate during a testing phase of the acceleration-sensitive sensor. The evaluation circuit is coupled to the resonant circuit to determine a performance reliability of the acceleration-sensitive sensor.

18 Claims, 22 Drawing Sheets

| Switch positions: | | | | | |
|---|---|---|---|---|---|
| Function | S1 | S2 | S3 | S4 | S5 |
| Normal operation | 0 | 1 | 0 | 1 | 0 |
| Self-test | X | X | X | X | 1 |
| Series resonance | 1 | 0 | 0 | 1 | 1 |
| Parallel resonance | 0 | 1 | 1 | 0 | 1 |

1 ≙ closed, 0 ≙ open approx. 50 µs

ELECTRONIC DEVICE HAVING AN
ACCELERATION-SENSITIVE SENSOR

This application is a divisional of application Ser. No. 08/545,858, filed on Feb. 26, 1996 now abandoned.

FIELD OF THE INVENTION

The present invention relates to an electronic device having an acceleration-sensitive sensor.

BACKGROUND INFORMATION

The German Patent No. 37 06 765 A1 discloses a crash (impact) sensor for a vehicle that comprises a test circuit. To be able to check the reliability of the crash sensor, an electro-acoustical transducer is provided, which acoustically exposes the acceleration sensor present in the crash sensor to ultrasonic waves. The electrical signals output by the acceleration sensor are checked in an evaluation and trigger circuit with respect to defined criteria with the help of a test circuit.

In addition, the German Patent No. 37 36 294 A1 discloses a device for testing acceleration sensors for correct functioning, where one or more accelerometers are electrically excited in such a way that one of the sensors acts as a transmitter of structure-borne noise, while the other(s) receives its signals. The accelerometers are thus checked by means of an evaluation circuit for functioning, calibration and coupling into the housing structure.

The German Patent No. 35 42 397 A1 discloses an arrangement for testing piezoelectric accelerometers for correct functioning, which uses a plurality of piezoelectric elements provided with electrodes, at least one of which, as a measuring sensor, produces an electrical reaction voltage when a force caused by the acceleration to be taken up is applied to it, and in the case of which, at least one of the piezoelectric elements acts for a time as an actuator for the other piezoelement, in that an electrical test voltage is supplied to the electrodes of the actuator element.

Furthermore, the U.S. Pat. No. 3,830,091 discloses a test device for acceleration sensors, which uses an aluminum rod, which is able to be excited to vibrate by piezoelectric crystals. A reference accelerometer and the accelerometer to be tested are mounted on the end face of the aluminum rod. An evaluation circuit compares the output signals from both of the accelerometers mounted on the end face of the aluminum rod, which are excited by the vibrating aluminum rod.

In addition, the U.S. Pat. No. 3,120,622 discloses a self-calibrating accelerometer, which uses an acceleration-sensitive element and, closely associated with said element, a piezoelectric element. When electrically excited, this piezoelectric element produces mechanical vibrations and, consequently, excites the acceleration-sensitive element.

Finally, the German Patent Application No. 38 09 299 C2 discloses an electronic device having an oscillatory sensor and an evaluation circuit for evaluating an output signal from the sensor that appears when said sensor is subjected to an acceleration load. This reference uses a vibration generator in the vicinity of the sensor capable of exciting the sensor to vibrate mechanically, the sensor being able to be excited for testing purposes by the vibration generator to produce vibrations which also include the resonant frequency of the sensor.

SUMMARY OF THE INVENTION

In an especially simple manner, the present invention makes it possible to check the electronic device for reliable operation, which also includes, in particular, testing the sensor. In contrast to the solutions known from prior art, no additional voltage sources or external vibration generators are needed to perform the test. It is especially advantageous that the sensor is a frequency-determining component of a resonant circuit and is able to be excited to vibrate by appropriately designing this resonant circuit, at least during a test phase, advantageously, however, constantly during the vehicle's operating times. As soon as the sensor vibrates, one can assume that it is in working order and that it is registering accelerations acting on the vehicle. Should the sensor be damaged, e.g., in the event of a break in the ceramic substrate or separation of electrodes or the like, it will not be possible to excite the sensor to vibrate. It is especially advantageous that the sensor can be alternately excited into series or parallel resonance by means of comparatively simple circuit elements, so that the possibilities for diagnosing the functioning of the sensor are broadened. The circuit elements are preferably triggered by a microcomputer, so that diverse switching variants can be simply programmed. Another advantageous refinement made by the present invention, the resonant circuit is dimensioned to allow the sensor to be excited to vibrate at its natural frequency. However, this natural frequency is substantially higher than the frequency range within which the useful signal to be evaluated is to be expected. Since low-pass filtering is expedient to better evaluate the useful signal, the oscillator frequency of the vibrating sensor cannot be easily transmitted to the evaluation circuit. Therefore, frequency-divider circuits are provided in the advantageous refinements of the present invention, which lower the oscillator frequency to a low value that is also able to still pass through the low-pass circuits.

In one especially advantageous exemplary embodiment of the present invention, a bistable flip-flop controlled by a microcomputer is used as a frequency-divider circuit. In another advantageous exemplary embodiment of the present invention, a clock signal for controlling the entire evaluation circuit is derived from the oscillator frequency of the vibrating sensor. The lack of existence of this clock signal can be simply used as a fault-detection means in the case of a defective sensor.

DETAILED DESCRIPTION OF THE INVENTION

Figures 1, 2:
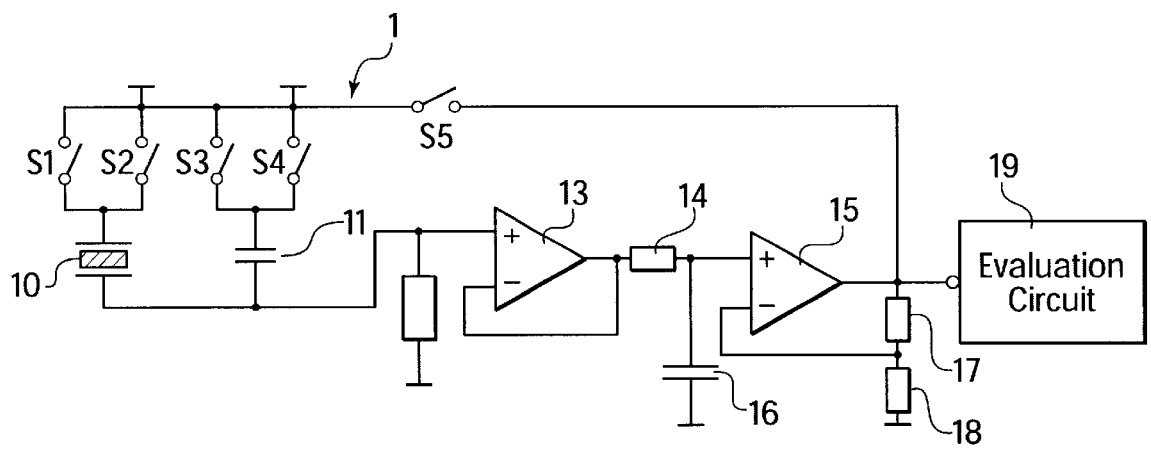
FIG. 1 shows a first circuit block diagram in accordance with the present invention.
FIG. 2 shows a switch position function table in accordance with the present invention.

FIG. 1 depicts a first exemplary embodiment of an electronic device 1 according to the present invention having an acceleration-sensitive sensor 10. A terminal connection of this sensor 10 is connected to the terminal connection of a first capacitor 11 and, in addition, to the non-inverting input of a first operational amplifier 13. The inverting input terminal of this first operational amplifier 13 is connected to the output terminal of this amplifier 13. Connected to the output of this amplifier 13 is a resistor 14, which is linked, in turn, to the non-inverting input of another operational amplifier 15. Another capacitor 16 is connected between ground and the non-inverting input terminal of the amplifier 15. The inverting input terminal of the amplifier 15 is connected to the interconnection point of two resistors 17 and 18. The other terminal of the resistor 18 is grounded, while the other terminal of the resistor 17 is connected to the output terminal of the amplifier 15. In addition, the output of the amplifier 15 is linked to the input terminal of an evaluation circuit 19. Finally, the output terminal of the amplifier 15 is also connected to the first pole of an input/output switch S5. The other pole of the switch S5 is linked to each pole of further input/output switches S1 and S3. The other pole of each of the switches S1 and S3 is connected to one pole of each of a third and fourth input/output switch S2, S4. Switch S1 is further connected to sensor 10, and switch S3 is further connected to capacitor 11. The other pole of each of the switches S2, S4 is connected to ground.

Figure 3:
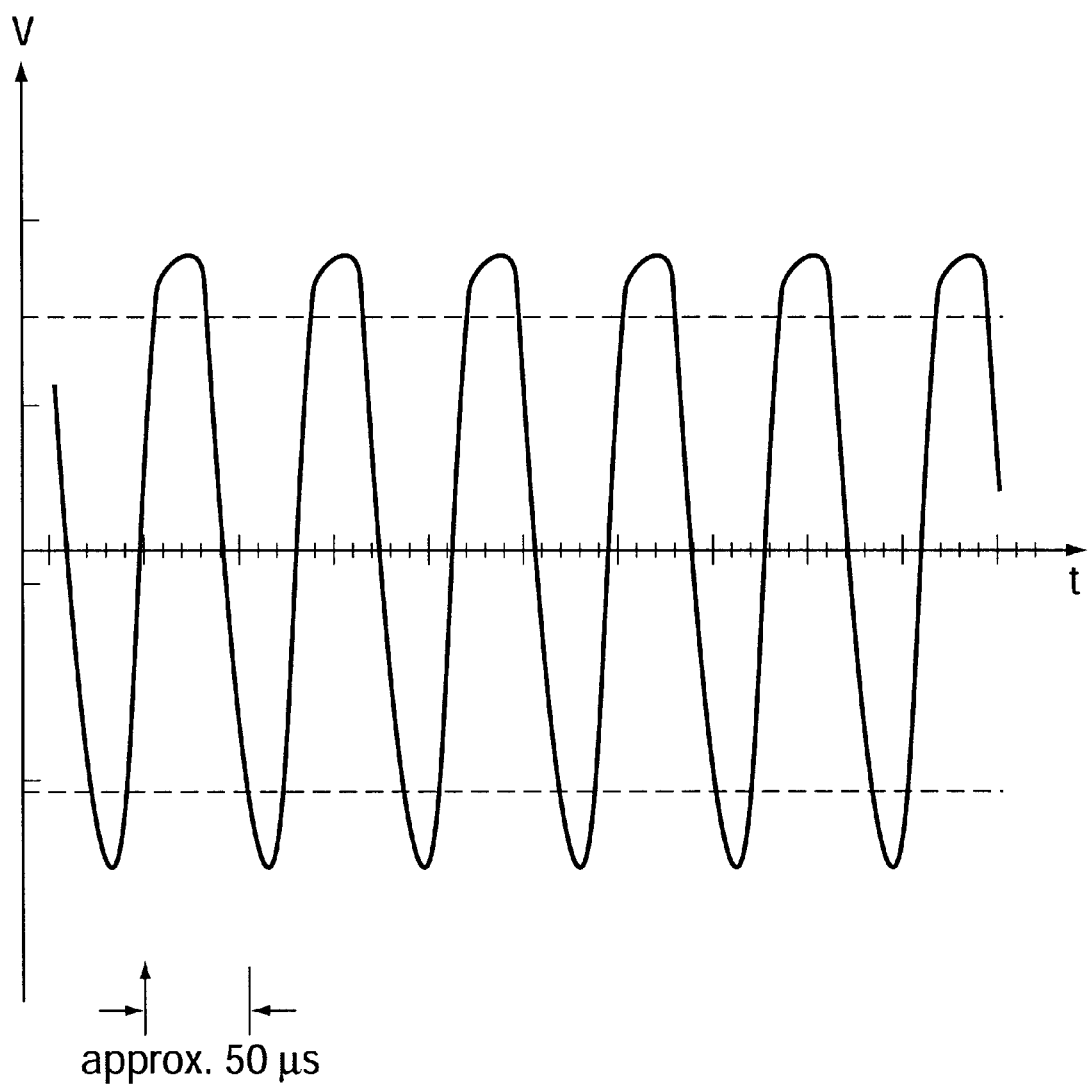
FIG. 3 shows a plot of voltage level as a function of time in accordance with the present invention.

FIG. 2 lists the specific switch positions and the resultant functions. In this table, the numeral 1 characterizes a closed circuit state in each case, while numeral 0 signifies an open circuit state. During normal operation of the electronic device, the switches S1, S3 and S5 are open, while the switches S2 and S4 are closed. For purposes of performing a self-test of the electronic device, the switch S5 is moved to the closed position. A vibration of the sensor 10 in series resonance is achieved when the switches S1 and S4 are closed, and the switches S2 and S3 are open. The sensor 10 is excited into parallel resonance by a switch position in which the switches S2 and S3 are closed, and the switches S1 and S4 are open. The function chart of FIG. 3, in which voltage values V are plotted as a function of the time t, elucidates the vibrational state of the sensor 10 in the event of feedback. Shown is a vibration at a frequency of approximately 12 kilohertz which is the resonance frequency at which the sensor 10 vibrates during test operation (when the switch S5 is closed). The sensor 10 vibrates in this case at its own, self-determined resonant frequency, without an external a.c. voltage having to be specified to excite vibration. In a simple evaluation, the resonant frequency is selected either in series or parallel resonance, and the corresponding frequency is determined. The frequency is determined in the evaluation circuit 19, in which the output signals emitted by the sensor 10 are also evaluated during normal operation. In this case, a frequency range is expediently specified, within which the resonant frequency of a sensor 10 in proper service condition must lie. In the case of a more complex evaluation, both the parallel, as well as the series-resonant frequency are determined. When these frequencies are determined, the knowledge of the capacitance of the sensor 10 suffices to additionally assess the sensitivity of the sensor 10 to acceleration, force, and the like.

Figure 4:
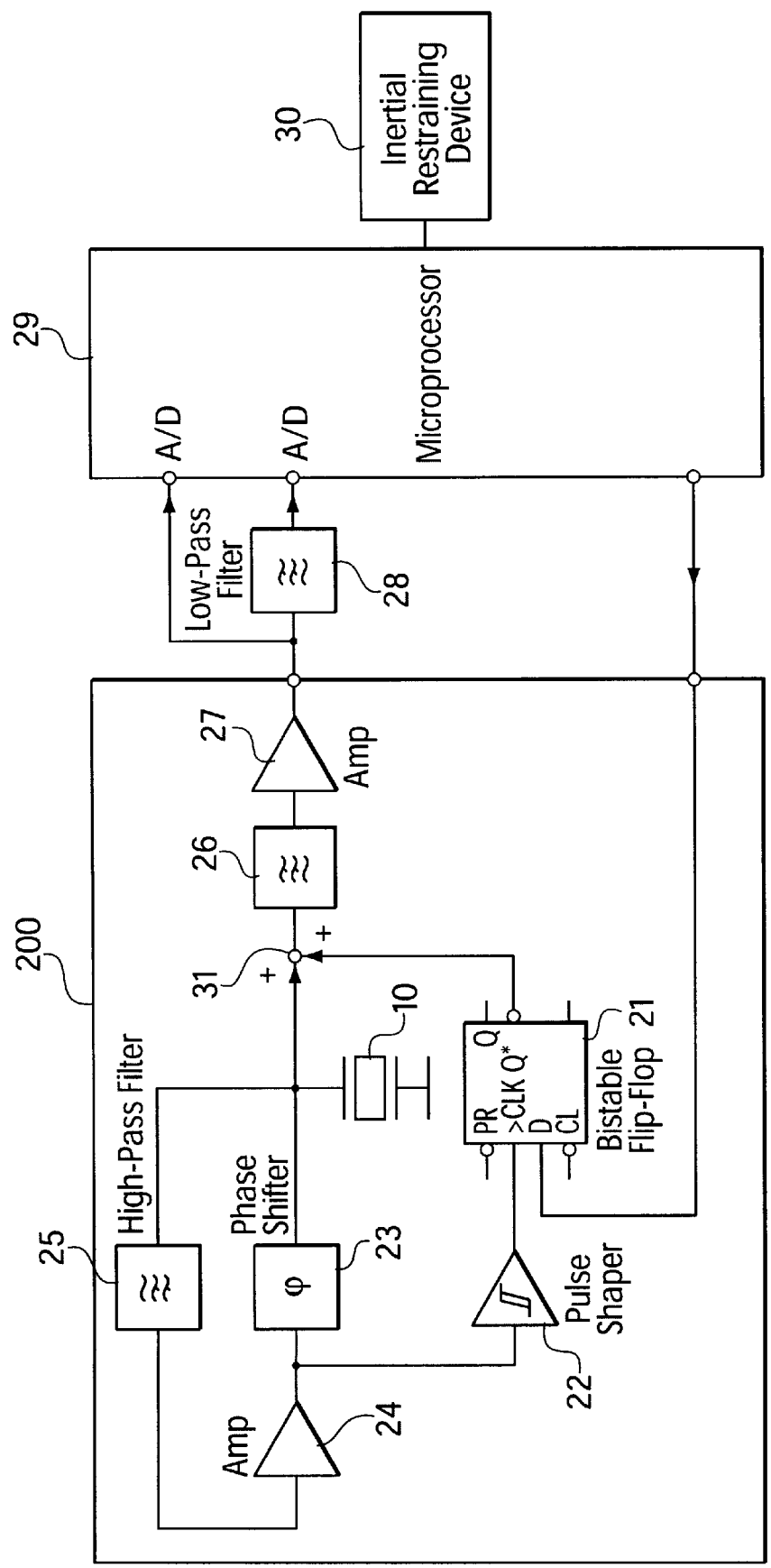
FIG. 4 shows a second circuit block diagram in accordance with the present invention.
Figure 5:
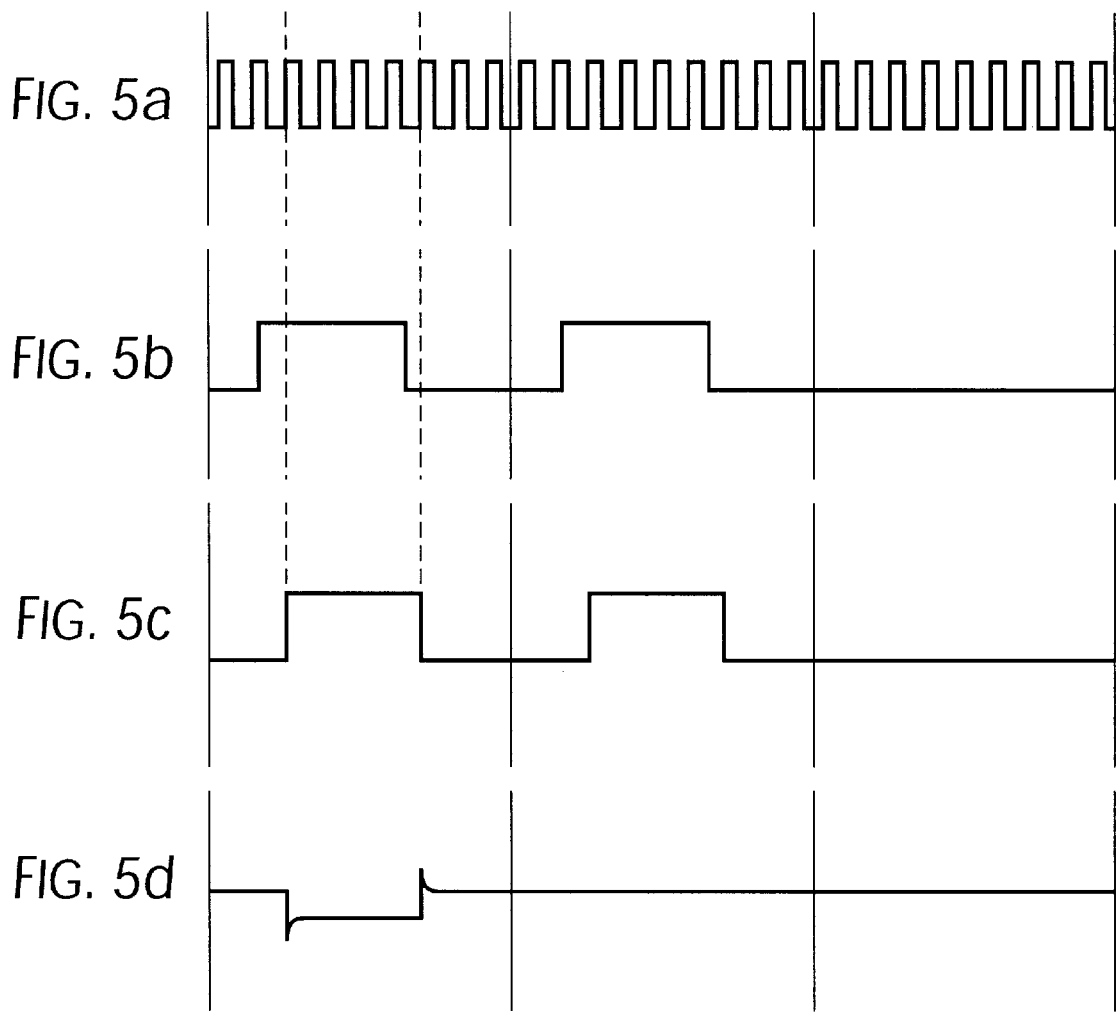
FIG. 5a shows a first signal timing diagram in accordance with the present invention.
FIG. 5b shows a second signal timing diagram in accordance with the present invention.
FIG. 5c shows a third signal timing diagram in accordance with the present invention.
FIG. 5d shows a fourth signal timing diagram in accordance with the present invention.

FIG. 4 shows a second exemplary embodiment of an electronic device according to the present invention is clarified in the following with reference to the block diagram shown in FIG. 4 and the function chart depicted in FIG. 5.

A piezoelectric sensor 10 is a component of a feedback resonant circuit which, in addition to the sensor 10, comprises a phase shifter 23, an amplifier 24, a high pass filter 25, and a voltage summing element 31 (voltage-summing element). A terminal of the sensor 10 is connected to the grounded connection of the device. The remote-to-ground terminal of the sensor 10 is linked to the input terminal of the voltage-summing element 31 and of the high-pass filter 25. The output terminal of the high-pass filter 25 is connected to the input terminal of amplifier 24. The output terminal of the voltage-summing element 31 is linked to the input terminal of a low-pass filter 26. The output terminal of the low-pass filter 26 is connected to the input terminal of an amplifier 27, whose output terminal is linked to the input terminal of another low-pass filter 28. The output terminal of the low-pass filter 28 is connected to a first input terminal of an analog-digital converter of a microcomputer 29. In the same way, the input terminal of the low-pass filter 28 is also connected to a second terminal of an analog-digital converter of the microcomputer 29. The link circuit between the amplifier 24 and the phase shifter 23 is connected to the input of a pulse-shaping stage 22, whose output terminal is connected to an input terminal of a bistable flip-flop 21. Another input terminal of the bistable flip-flop 21 is connected to a test terminal, which is linked to an output terminal of the microcomputer 29. The output terminal of the bistable flip-flop 21 is connected to the remote-to-ground terminal of the sensor 10. The aforesaid components 20–27 are combined in a sensor module 200. If necessary, it is also possible to arrange this sensor module 200 spatially separated from the microcomputer 29. This is especially useful when acceleration-sensitive sensors 10 have to be mounted in decentralized locations, i.e., near the skin of the vehicle, for example, to be able to detect a side impact. In addition, one output of the microcomputer 29 is connected to at least one inertial restraining device 30 for vehicle occupants, such as an airbag and/or a belt tightener.

The method of functioning of this exemplary embodiment is described in the following. As soon as an acceleration is exerted on the sensor 10 due to forces acting on the vehicle, the sensor 10 undergoes a deformation, which is manifested by a voltage that is able to be tapped off at the connecting terminals of the sensor 10. The output voltage of the sensor 10 is filtered through a low-pass filter 26 and brought with the aid of the amplifier 27 to a specifiable nominal sensitivity. The amplifier 27 is preferably a programmable calibration amplifier. The amplified output signal from the sensor 10 is expediently routed through another low-pass filter 28, before it is fed to a first input terminal of an analog-digital converter, which is arranged in a microcomputer 29. In this microcomputer 29, the output signal emitted by the sensor 10 is checked to determine whether a crash situation exists. If a crash situation critical to vehicle occupants is recognized on the basis of the analysis of the output signal from the sensor 10, then the microcomputer 29 triggers a safety means 30 for safeguarding the vehicle occupants, such as an airbag and/or a belt tightener. In the case of electronic devices of this type provided for the safety of vehicle occupants, it is of the utmost importance that constant operational readiness be guaranteed. At least in the event of a malfunction, the driver should be given an indication, for example by having a warning lamp light up, so that he can then immediately go to a service station, if need be. It is possible for the sensor 10 of an especially critical component to be checked, because the sensor 10 is a component part of a feedback resonant circuit 10, 23, 24, 25 and is excited to vibrate in this resonant circuit for at least the duration of a functional (performance) test. It has proven to be especially expedient to continually excite the sensor 10 to vibrate, since this makes it possible to continuously monitor the sensor 10. The resonant circuit is preferably so dimensioned that the sensor 10 vibrates at a natural frequency, which lies in the order of magnitude of multiples of 10 kilohertz for conventional sensors. Assume as an example that FIG. 5a illustrates the output of sensor 10 when it is made to vibrate at a frequency range of 30 Kilohertz to 40 Kilohertz. Such a vibrational frequency is substantially higher than the acceleration-dependent useful signal, which is supposed to be evaluated by the microcomputer 29. This useful signal lies within the range of multiples of 100 hertz and can thus pass through the low-pass filters 26 and 28, whose critical frequency lies, for example, at approximately 250 hertz. However, these low-passes do not permit the comparatively high vibrational frequency of the sensor 10 excited to natural vibrations to pass. In order to nevertheless determine whether the sensor 10 actually vibrates in its resonant circuit 10, 23, 24, 25 and is, therefore, fully functional, a bistable flip-flop 21 is provided, whose output terminal is connected to the remote-to-ground terminal of the sensor 10. The high-frequency test signal at the output of the amplifier 24 is fed to a first input terminal of the bistable flip-flop 21 via the pulse-shaping stage 22. A control signal, which is generated by the microcomputer 29 and is applied to the test terminal of the sensor module 200, is supplied to a second input terminal of the bistable flip-flop 21. This control signal, which preferably has the shape of a square-wave signal with an amplitude of about 5 volts and a low frequency (e.g. a few kilohertz) determined by the microcomputer 29, is depicted in FIG. 5b. This control signal is applied to the D-input of the bistable flip-flop 21. Now, as soon as the next positive edge of the oscillator vibration (FIG. 5a) tapped off at the output of the amplifier 24 is applied to the input of the bistable flip-flop 21, in each case the active state of the D-input of the bistable flip-flop 21 is switched through to its output terminal. Thus, the signal depicted in the diagram of FIG. 5c is applied to this output. This signal is superposed at the summing point 31 depicted in the block diagram of FIG. 4, before the low pass filter 26, with the output signal from the sensor 10 to be attributed to the effect of acceleration and, together with this output signal, can pass through the low pass filter 26 and the amplifier 27, so that, for instance, the schematically depicted signal in FIG. 5d is applied to the output terminal of the amplifier 27. Since the microcomputer 29 knows the frequency and amplitude of the control signal that is fed to the D-input of the bistable flip-flop 21, it is able to easily recognize whether the output signal tapped off at the output of the amplifier 27 is modulated with this control signal. If this modulation exists, one can conclude that the sensor 10 is functioning properly, since it only vibrates under such circumstances and the vibrational state of the sensor 10 assures that the modulating control signal is switched through to the output terminal of the bistable flip-flop 21. In the event of a defective sensor, due, for example, to a break in the ceramic substrate, depolarization of the sensor, separation of electrodes and the like, the sensor 10 cannot be excited to vibrate. Accordingly, the signals being applied to the input terminal D of the bistable flip-flop 21 are also not switched through to their output terminal. At the same time, faults in the signal path, such as line interruptions, and component defects within and outside of the sensor module 200 can be detected.

Figure 6:
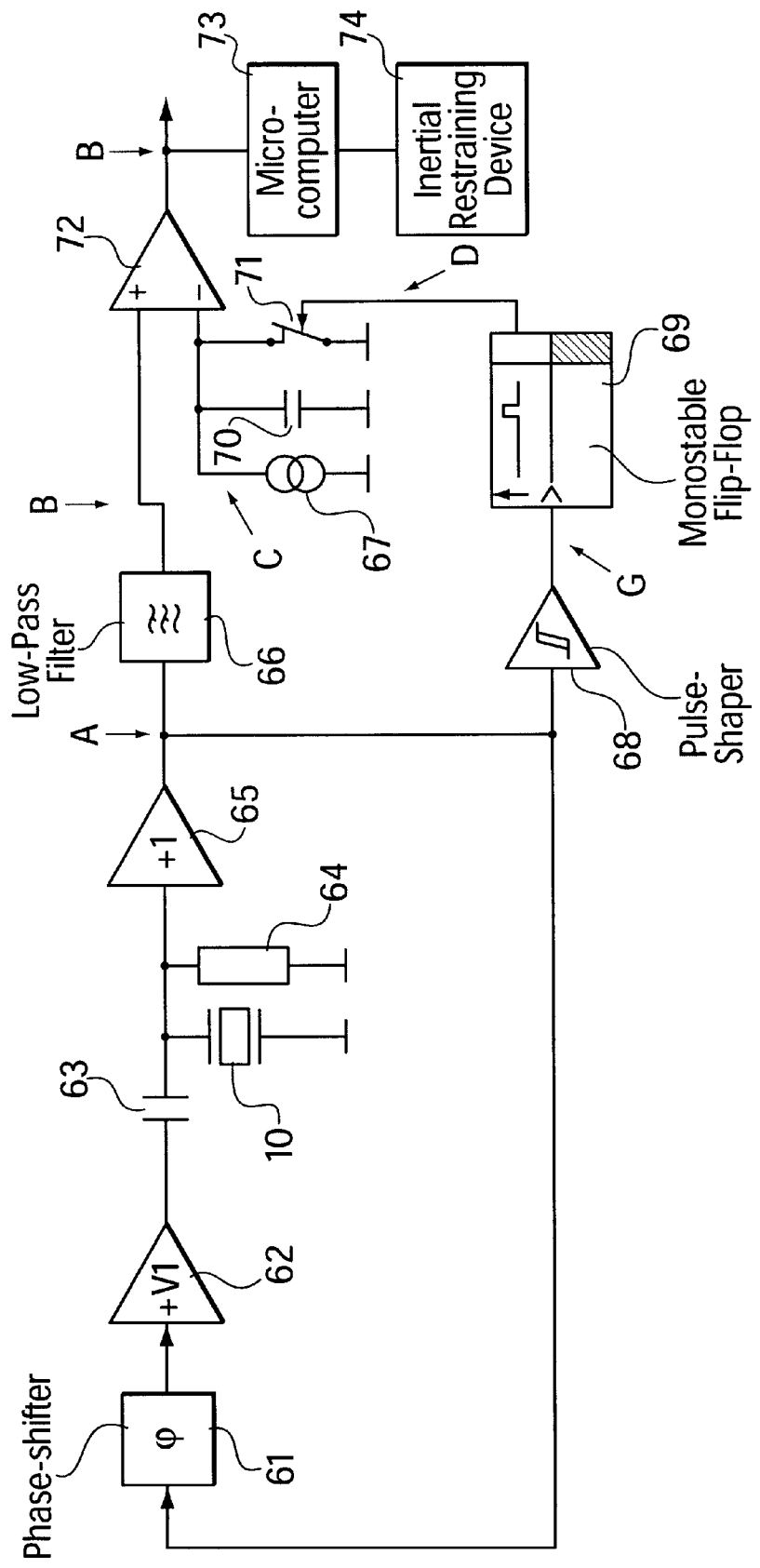
FIG. 6 shows a third circuit block diagram in accordance with the present invention.

A third exemplary embodiment of the electronic device according to the invention is depicted by FIG. 6 and FIG. 7.

In this case, FIG. 6 shows a block diagram of the device, while FIG. 7 represents a function chart with numerous signal shapes, which can be established at various points of the block diagram according to FIG. 6.

In FIG. 6, a piezoelectric sensor 10, which when subjected to a bending strain resulting from the effect of acceleration, emits a signal at its connecting terminals. One terminal of the sensor 10 is connected to the grounded connection of the electronic device. The remote-to-ground terminal of the sensor 10 is linked to a terminal of a capacitor 63 and also to the input terminal of a buffer amplifier 65. A resistor 64 is connected in parallel to the sensor 10. The second terminal of the capacitor 63 is linked to the output terminal of another amplifier 62, whose input terminal is linked to a phase shifter 61, whose input terminal is connected to the output terminal of the buffer amplifier 65. Furthermore, the input terminal of a low-pass filter 66, whose output terminal is connected to the non-inverting input terminal of an operational amplifier 72, is linked to the output terminal of the buffer amplifier 65. A reference current source 67, a capacitor 70, and a switch element 71, which are connected in parallel to one another, are linked to the inverting input terminal of the operational amplifier 72. The second terminals of the previously mentioned components 67, 70, 71 are connected to the grounded connection of the electronic device. In addition, the output terminal of the buffer amplifier 65 is linked to the input terminal of a signal conditioner stage 68, whose output terminal is connected to the trigger input of a monostable flip-flop 69. The output terminal of the monostable flip-flop 69 is linked to the control connection of the circuit element 71. The output terminal of the operational amplifier 72 is connected to an input terminal of a microcomputer 73, whose output terminal is connected to the input terminal of inertial restraining devices 74 for vehicle occupants, such airbags and/or belt tighteners.

Figure 7A:
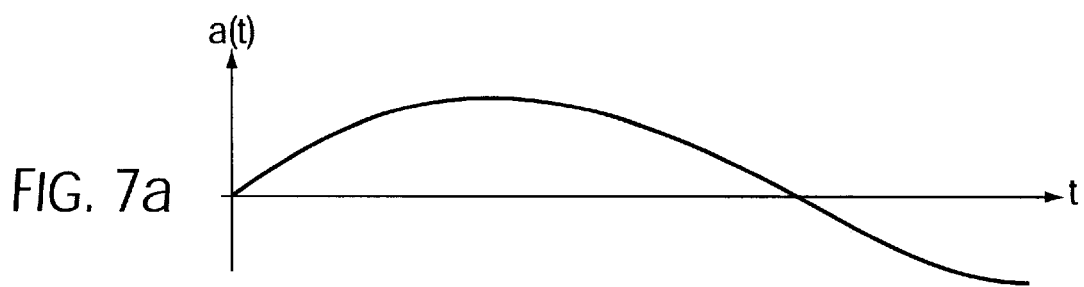
FIG. 7a shows a first signal function chart corresponding to the third circuit block diagram according to the present invention.
Figure 7B:
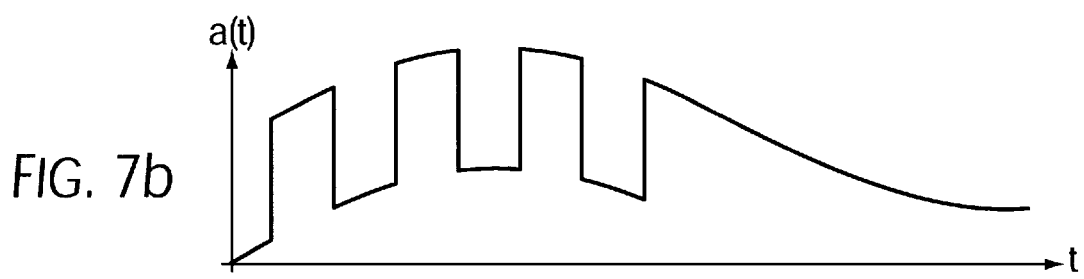
FIG. 7b shows a second signal function chart corresponding to the third circuit block diagram according to the present invention.
Figure 7C:
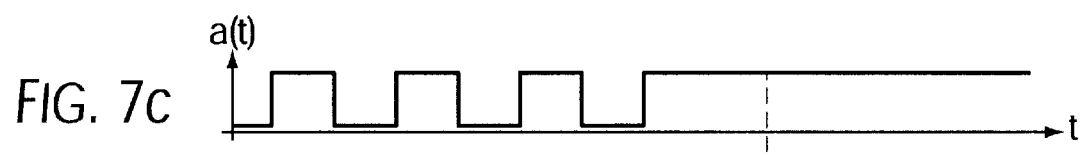
FIG. 7c shows a third signal function chart corresponding to the third circuit block diagram according to the present invention.
Figure 7D:
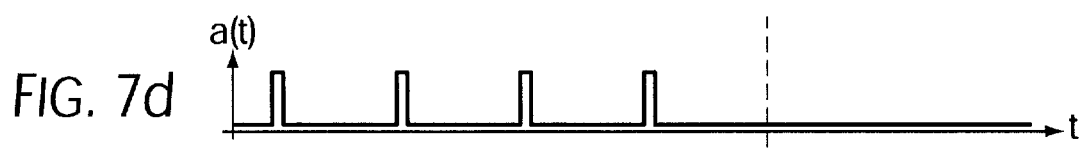
FIG. 7d shows a fourth signal function chart corresponding to the third circuit block diagram according to the present invention.
Figure 7E:
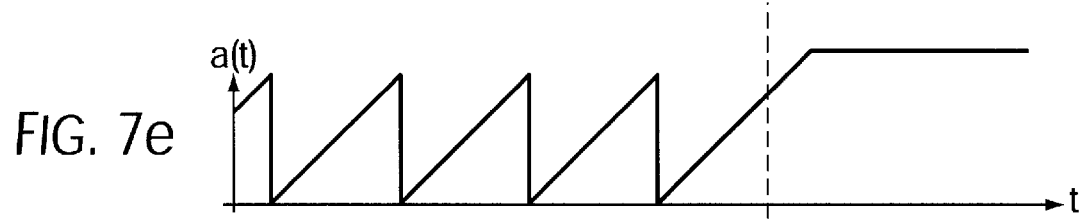
FIG. 7e shows a fifth signal function chart corresponding to the third circuit block diagram according to the present invention.
Figure 7F:
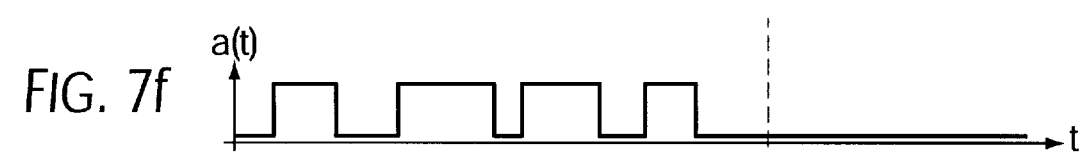
FIG. 7f shows a sixth signal function chart corresponding to the third circuit block diagram according to the present invention.
Figure 7G:
FIG. 7g shows a seventh signal function chart corresponding to the third circuit block diagram according to the present invention.

As already mentioned, acceleration acting on the connecting terminals of the sensor 10 causes a signal voltage to be applied, which is tapped off at the resistor 64 that is connected in parallel to the sensor 10 and is supplied to the buffer amplifier 65 for the purpose of further processing. At the same time, the sensor 10 is a frequency-determining component of a feedback resonant circuit comprising the components 10, 61, 62, 63, 65. When the vibrational state also is fulfilled, which can be easily achieved by properly dimensioning the components, the resonant circuit oscillates at a natural frequency of the sensor 10. Depending on the mechanical design of the sensor 10, the resonant frequency lies in the order of magnitude of multiples of 10 kilohertz, e.g. between about 10 and 60 kilohertz. FIG. 7a illustrates a typical acceleration signal, while FIG. 7b shows the acceleration signal superposed on the oscillation signal according to the present invention. The superposed signal is applied to the circuit point A. For further processing and evaluation of the acceleration signal, the signal being applied to point A of the circuit must again be freed from the clock signal of the oscillator circuit. This can be easily done by a properly dimensioned low-pass filter 66, whose signal band width is in the order of magnitude of 100 hertz, (e.g., 0 to 500 hertz) in particular 200 to 300 hertz. The acceleration signal that has been freed from the clock signal of the oscillator circuit in accordance with the signal diagram of FIG. 7a is then available at the circuit point B of the block diagram in accordance with FIG. 6 and is then fed to the non-inverting input terminal of the operational amplifier 72. The signal that is active at the circuit point A (compare FIG. 7b) is also fed to the input terminal of the signal conditioner stage 68, which converts the signals as shown in FIG. 7b into clean digital signals as shown in FIG. 7c. The signals as shown in FIG. 7c are applied to the circuit point G. The monostable flip-flop 69 is triggered with these signals. The consequence of this is that signals corresponding to the diagram of FIG. 7d are active at the output terminal of the monostable flip-flop 69 (circuit point D) and are received by the control input of the switch element 71. Accordingly, this switch element 71 is opened and closed in the clock cycle of these signals shown in FIG. 7d, through which means the capacitor 70 is periodically charged and again discharged. The essentially saw-tooth-shaped signal shown by FIG. 7e is then active at the inverting input terminal of the operational amplifier 72. For as long as the acceleration signal being applied to the circuit point B, and thus also to the non-inverting input terminal of the operational amplifier 72, is larger with respect to its amplitude than the amplitude of the saw-tooth-shaped signal voltage shown in FIG. 7e, the output terminal of the operational amplifier 72 remains at a high signal level that corresponds to a logical 1. If the acceleration signal at the circuit point B is lower than the saw-tooth-shaped voltage shown in FIG. 7e, then the level at the output terminal of the operational amplifier 72 drops to the value logical 0. Accordingly, a pulse-width modulated signal (as shown by FIG. 7f) is applied to the output terminal of the operational amplifier 72 (circuit point F), which is modulated with the frequency of the oscillator circuit. The information about the magnitude of the acceleration lies in the time duration of the higher level (logical 1) at the output terminal of the operational amplifier 72. The smaller the acceleration value applied to the sensor 10, the shorter the pulse duration is. The prevailing pulse duration can be simply evaluated in the microcomputer 73. When the established acceleration level points to the occurrence of a serious accident, the output of the microcomputer 73 triggers inertial restraining devices 74 for vehicle occupants, such as airbags and/or belt tighteners, in order to protect the vehicle occupants. The output signal that is adapted to be tapped off at the circuit point A contains two pieces of information that are independent from one another (compare the diagram of FIG. 7b). One piece of information concerns the acceleration acting upon the sensor and the other piece of information concerns the oscillation (clock) frequency at which the sensor 10 oscillates in the resonant circuit. Any existing fault conditions, in particular also faults in the sensor 10 can now be simply detected when the clock signal fails to appear. Since the microcomputer 73 is dependent on the clock pulse (it does measure the time between the positive and negative edge of the signal as shown in the diagram 7f) when the signal applied to the circuit point F is evaluated, it will recognize that the clock pulse fails to happen and branch over to a fault condition. When the sensor 10 oscillates, for example, at an oscillation frequency of 20 kilohertz, a fault condition can be recognized already after about 50 microseconds because this oscillatory clock pulse fails to materialize. The following fault conditions in particular cause the clock signal to fail to appear and thus lead to a fault recognition:

all faults in the oscillator circuit 10, 61, 62, 63;
    faults in the buffer amplifier 65;
    faults in the signal conditioner stage 68;
    faults in the reference current source 67;
    faults, in particular short-circuiting in the case of the capacitor 70;
    defective circuit element 71;
    defective operational amplifier 72.

The principle introduced with this exemplary embodiment works with all data transmission methods, whose functioning necessarily depends on a clock signal and which include the system clock, or at least parts of it, still in the output signal. For example, in place of the pulse-width modulation described here, a sigma-delta transducer could also be used. A digital data transmission is also conceivable. To implement such a transmission, the pulse-width modulator would have to be replaced by an analog-digital converter, whose output signal would be routed sequentially to the microcomputer 73. A transmission of this type would additionally require a synchronous sequential circuit (logic device), which would also have to be clocked with the oscillatory clock pulse of the sensor 10.

Figure 8:
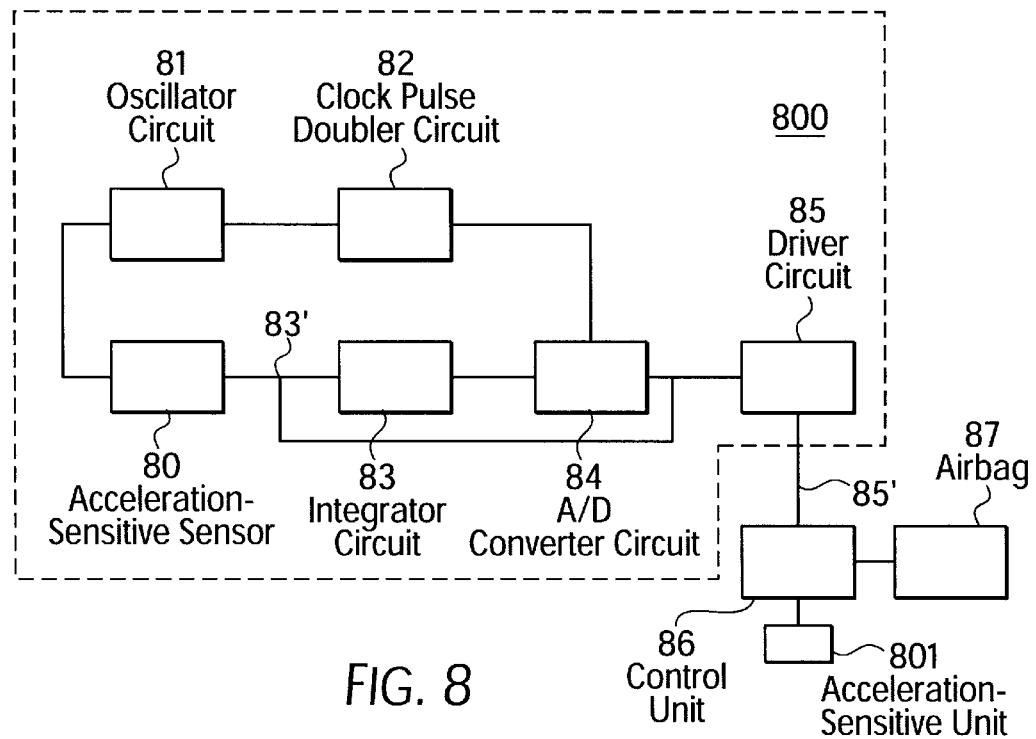
FIG. 8 shows a fourth circuit block diagram according to the present invention.

The electronic device according to the present invention is quite advantageously suited for applications with passenger-safety restraint systems, which, in addition to a centrally arranged control unit comprising at least one acceleration-sensitive sensor accommodated in this centrally arranged control unit, are also provided with external or externally located acceleration-sensitive sensors mounted, for example, near the vehicle skin. Such safety systems are meeting with growing interest of late, because automotive manufactures are taking pains to avoid the disadvantageous effects of side impacts by installing so-called side airbags. Accidents of this type occur relatively frequently in city traffic in particular. They also entail special difficulties in the timely detection and introduction of safety measures because, in comparison to frontal collisions, only a relatively small crash crumple zone is available. When, for example, there is an impact against a door of the vehicle, it must be recognized in an extremely short time, for example before three milliseconds elapse, that an accident that is fraught with risk has occurred. Within this time, the door skin moves to the inside by only a few centimeters. A corresponding signal from the acceleration-sensitive sensor mounted, for example, in the affected door must then be transmitted to the centrally arranged control unit, which evaluates the signals resulting from the accident and, if necessary, emits tripping signals to activate the restraining devices, for instance the airbag. A digital signal transmission is preferred in this case for reasons of interference immunity. In FIG. 8, a control unit 86 is centrally arranged in the vehicle and comprises, inter alia, evaluation circuits for the output signals from acceleration-sensitive sensors, e.g. also from a centrally mounted acceleration-sensitive sensor 801. An airbag that is capable of being activated by the control unit 86 is designated by 87. The electronic device also comprises a sensor module 800, which is accommodated in the vehicle separated locally from the centrally arranged control unit 86. For example, the sensor module 800, which comprises another acceleration-sensitive sensor 80, is accommodated in the vicinity of the vehicle skin, for example, preferably in a vehicle door. Of course, a plurality of such sensor modules 800, which are linked to the centrally arranged control unit 86, can be mounted in the vehicle. In addition to the sensor 80 already alluded to, the sensor module 800 comprises an oscillator circuit 81, a clock-pulse multiplier circuit, in particular a clock-pulse doubler circuit 82, an integrator circuit 83, an analog-digital converter circuit 84, as well as a driver circuit 85. In this case, the output terminal of the analog-digital converter circuit 84 is connected at the node 83' to the input terminal of the integrator circuit 83 and to the input terminal of the driver circuit 85. The output terminal of the driver circuit 85 is linked to the input terminal of the remotely arranged control unit 86. The output terminal of the clock-pulse doubler circuit 82 is linked to a clock input of the analog-digital converter circuit 84.

Figure 9:
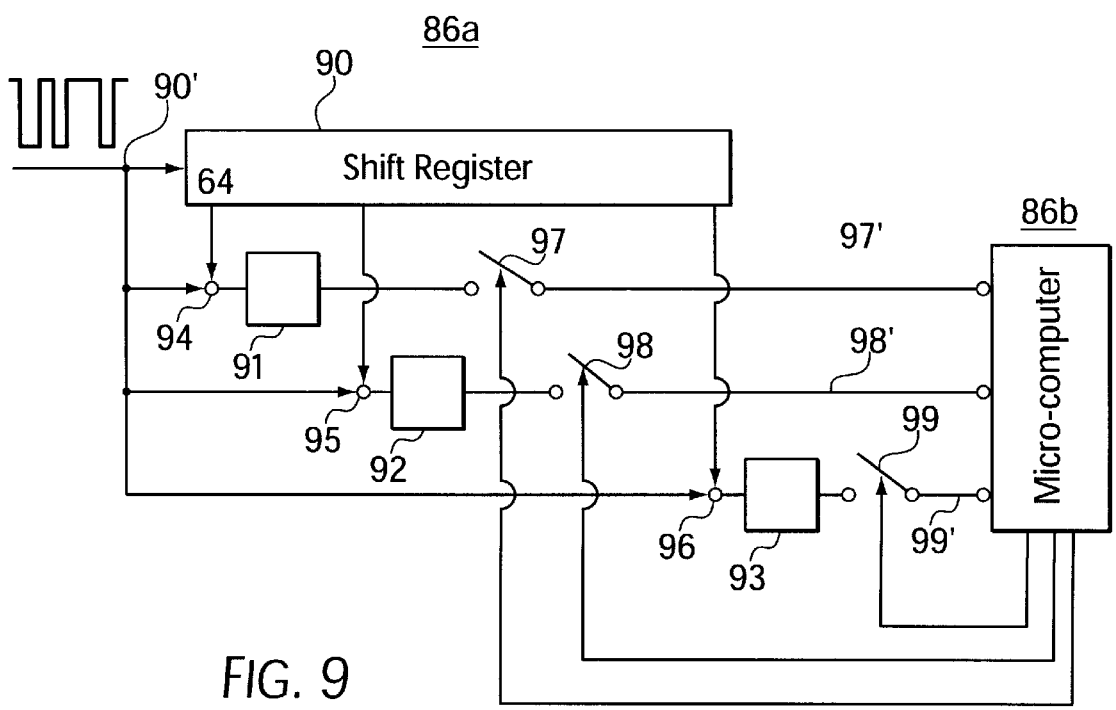
FIG. 9 shows a shift register with summing elements according to the present invention.
Figure 10:
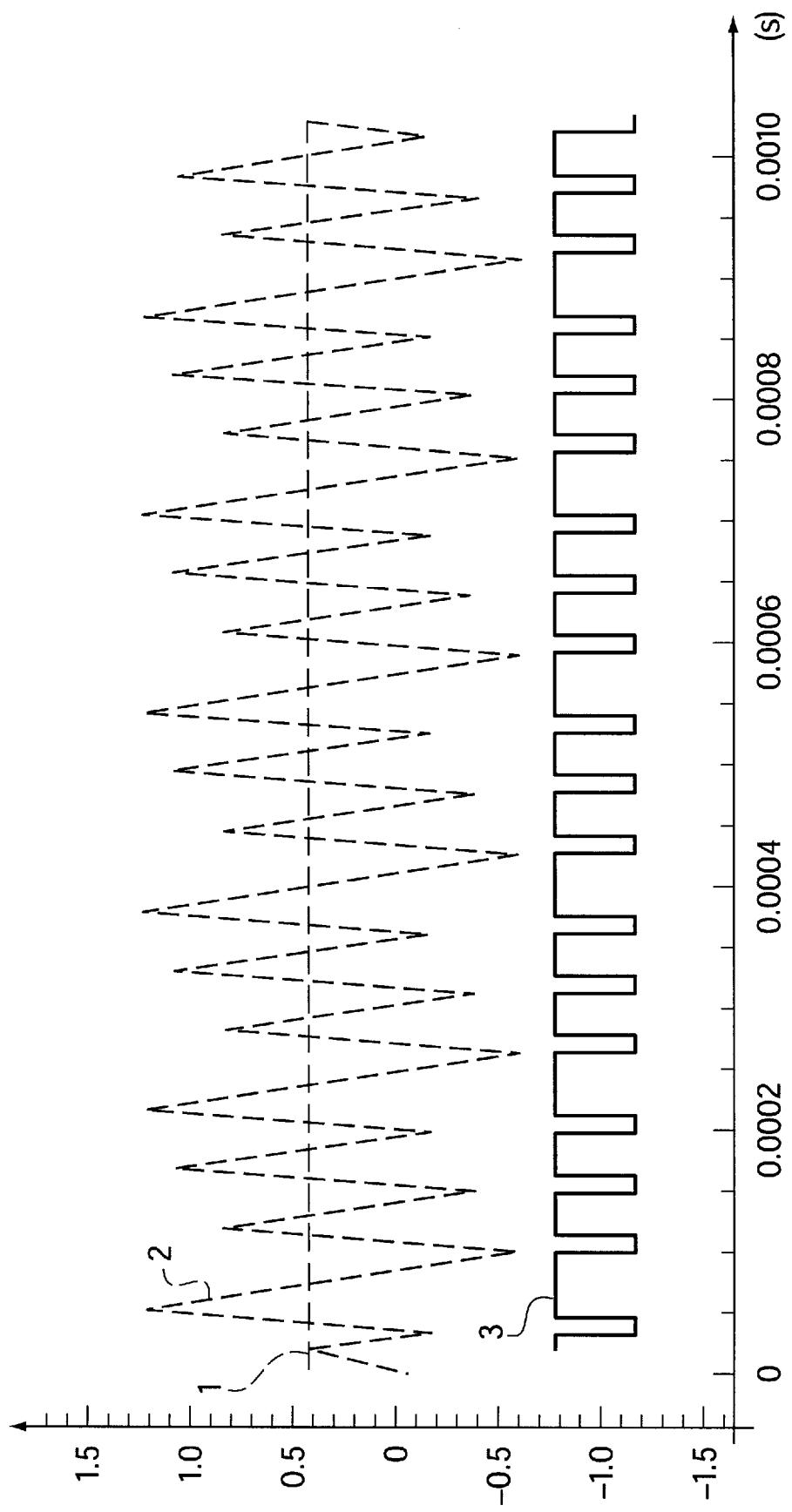
FIG. 10 shows a graph of signal outputs as a function of time according to the present invention.
Figure 11:
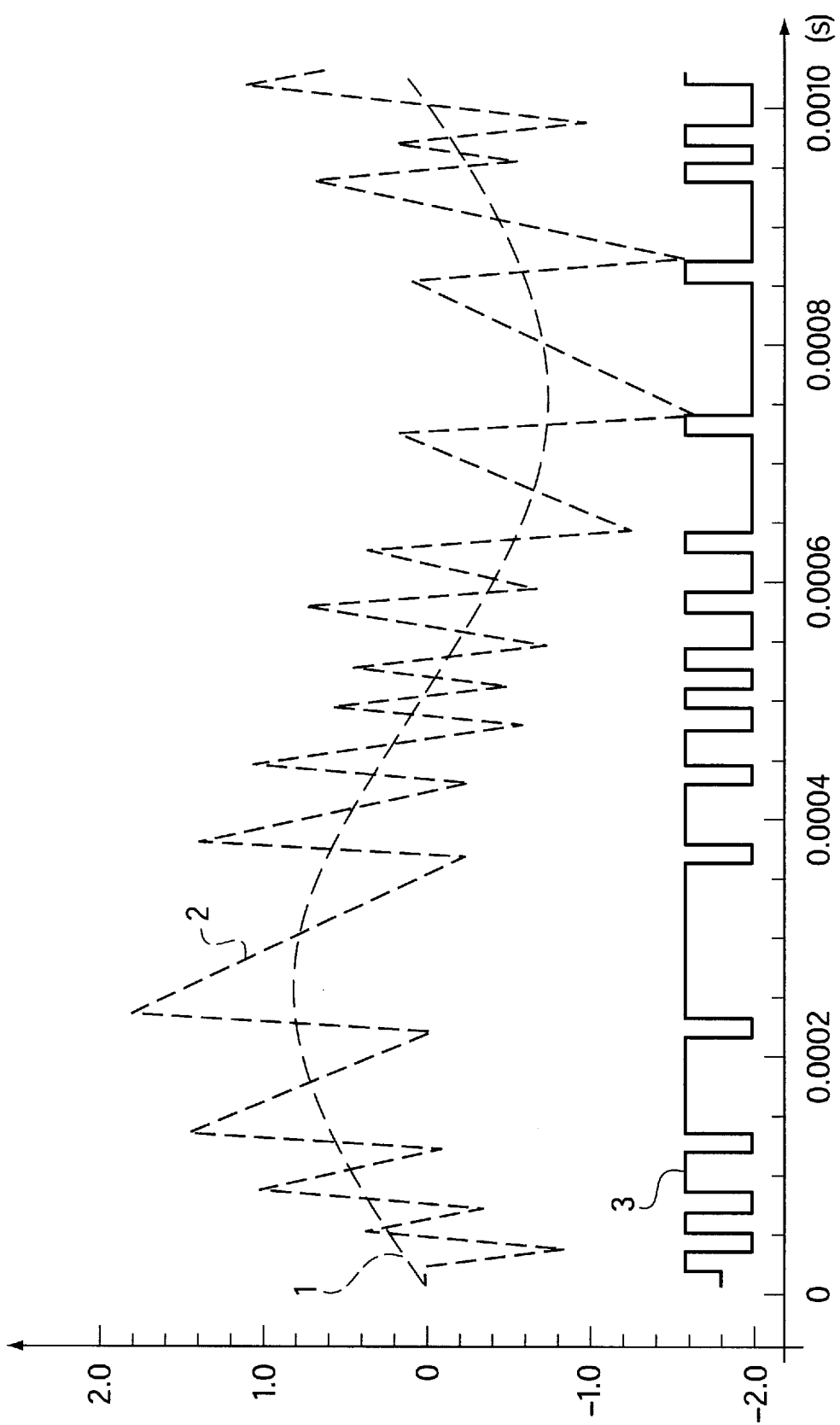
FIG. 11 shows a second graph of output signals as a function of time according to the present invention.
Figure 12:
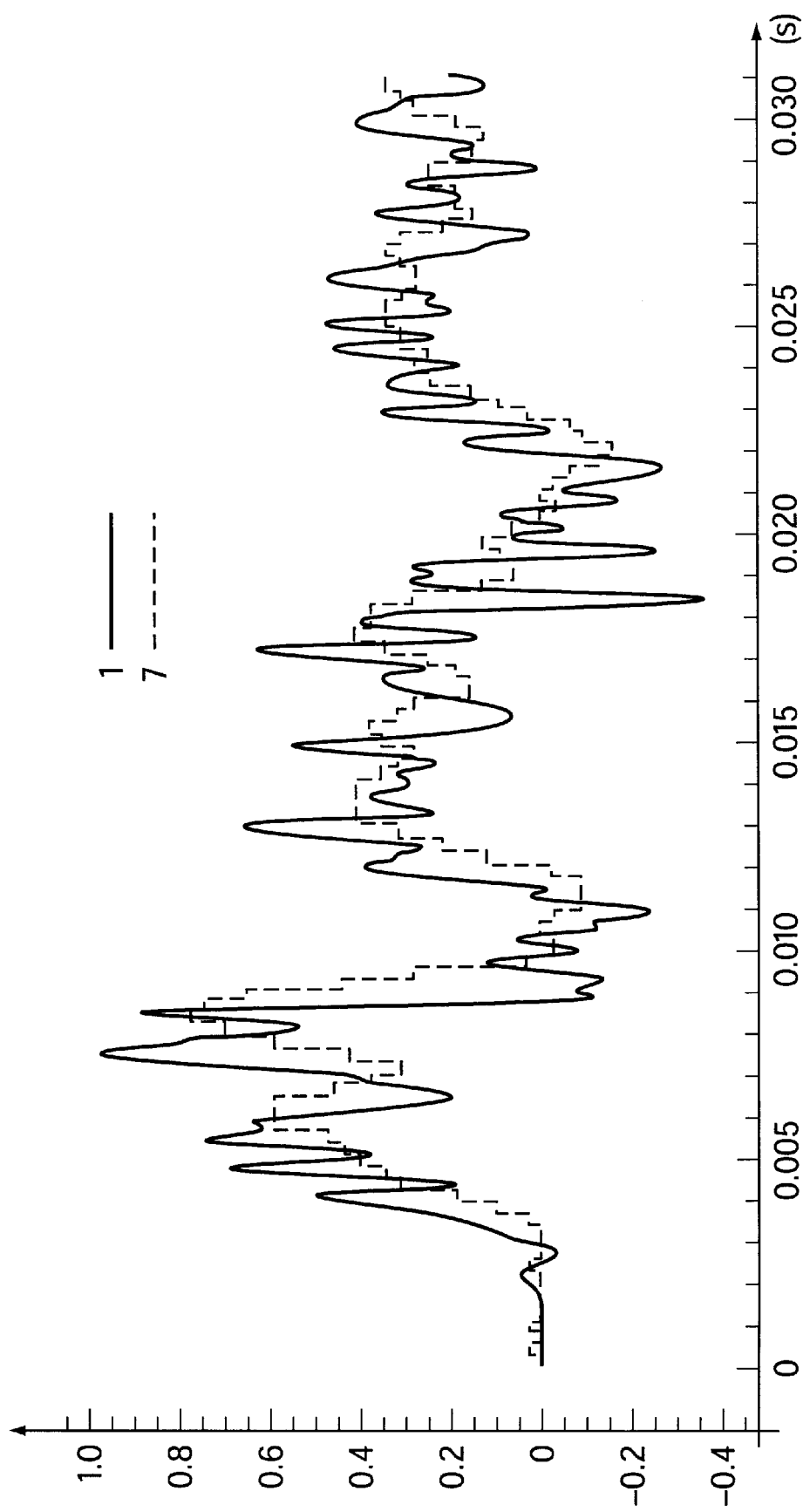
FIG. 12 shows a third graph of output signals as a function of time according to the present invention.

As already described in conjunction with the above clarified exemplary embodiments, the acceleration-sensitive sensor 80 and the oscillator circuit 81 make up a resonant circuit, which is capable of being excited to oscillate and which excites the sensor 80 to vibrate at its resonant frequency. Depending on the specific embodiment of the sensor 80, this resonant frequency can lie within an order of magnitude of 10 kilohertz, for example, to 32 KHz. This oscillation frequency is supplied to the downstream clock-pulse multiplier circuit, in particular to the clock-pulse doubler circuit 82, which doubles the oscillation frequency to a frequency of, for example, TS=64 KHz. This frequency is fed as a clock frequency to the clock input of the analog-digital converter circuit 84, which converts the output signal active at the output terminal of the integrator circuit 83 with the previously mentioned clock frequency TS into a digital signal, which is routed via a driver circuit 85 to the remotely arranged control unit 86. At the node 83', the output signal from the acceleration-sensitive sensor 80, which is subjected through the modules 83 and 84 to a sigma-delta modulation, is supplied to the input terminal of the integrator circuit 83. This modulation method is clarified on the basis of two examples, illustrated by FIG. 10 and FIG. 11. In the first example in accordance with FIG. 10 assumes that a constant output signal from the sensor 80 having the relative amplitude of 0.4 that is constant over time is being applied to the input terminal of the integrator circuit 83, thus at the node 83'. In FIG. 10 this signal is represented by the curve 1 running parallel to the time axis. The output signal being applied to the output terminal of the integrator circuit 83 is illustrated by the curve 2 shown with a dotted-line curve path. Finally, the digital output signal, which is active at the output terminal of the analog-digital converter circuit 84 and which had been acquired by sampling the integrator output signal with the clock frequency TS of for example, 64 KHz, is shown in the lower part of the diagram of FIG. 10 as a solid-line curve path (curve 3). The result is a pulse-width modulated square-wave signal. FIG. 11 clarifies the previously described signal conversion, it being assumed now, however, for instance that a sinusoidal signal having the relative amplitude 0.8 and the frequency 1000 Hz exists as the output signal from the sensor 80. This output signal from the sensor 80 is depicted as curve 1 in FIG. 11. The output signal from the integrator circuit 83, in turn, is shown as curve 2 and, finally, the digital output signal active at the output terminal of the analog-digital converter circuit 84 is shown as curve 3. Both FIG. 10 and FIG. 11 depict the signal pattern within a time interval of about one millisecond. After passing through the driver circuit 85, the output signals described previously and shown in FIG. 10 and FIG. 11 are routed to the remotely arranged control unit 86. The driver circuit 85 is used in particular in this case for a level adaptation, for example a gain. A twisted pair cable that is not shielded can be expediently used for the transmission between the output terminal of the driver circuit 85 and the input terminal 85 of the control unit 86. This makes it possible for the remotely arranged sensor modules 800 to be connected to the centrally arranged control unit 86 relatively simply and cost-effectively. The control unit 86 contains an evaluation circuit for the digital output pulses supplied by the sensor module 800; essential details pertaining to these pulses are depicted in FIG. 9 as a block diagram. The evaluation circuit comprises modules 86a and 86b. The module 86a, for its part, comprises a shift register 90 having at least one input and a plurality of outputs, as well as a plurality of summing elements 91, 92, 93 and circuit elements 97, 98, 99. Each output of the shift register 90 is linked by a node 94, 95, 96 to the input terminal of one summing element 91, 92, 93, respectively, assigned to the output of the shift register 90. Also, the input terminal of the shift register 90 is connected to each of the mentioned nodes 94, 95, 96. Each output terminal of each summing element 91, 92, 93 is connected to a circuit element 97, 98, 99, respectively. The circuit elements 97, 98, 99, in turn, are connected to the input terminals of a microcontroller (module 86*b*). By way of output terminals of the microcontroller 86*b* and the depicted link circuits, the circuit elements 97, 98, 99 are able to be triggered with a specifiable time cycle, such that the circuit elements 97, 98, 99 open and close in response to clock pulses and, in the closed state, route the output signal active at the output terminals of the summing elements 91, 92, 93 to the input terminals of the microcontroller 86*b*. It will now be explained by way of example on the basis of the signals shown in FIG. 12, FIG. 13 and FIG. 14 how the output signals of the sensor 80, thus the signals generated at the circuit point 83' of the sensor module 800, are transmitted by means of the modules 83, 84, 85, 86 from the remotely mounted sensor 80 to the centrally arranged control unit 86 and are conditioned for a further evaluation by the control unit 86. In each of the aforesaid FIGS. 12, 13, 14, a time interval of 30 milliseconds is plotted on the time axis. Relative acceleration values between the values of −0.4 and +1.0 are shown on the ordinate. The relative acceleration value 1.0 corresponds in this case more or less to a value of about 50 g, thus 50 times acceleration due to gravity. In all three of FIGS. 12 through 14, the curve 1 shown as a solid line represents the output signal from the sensor 80 at the node 83' in FIG. 8. The pulses routed from the driver circuit 85 via the line 85' to the control unit 86 are supplied at the circuit point 90' to the input terminal of the shift register 90. The pulses active at the input terminal of the shift register 90 are read with a clock pulse of 64 KHz into the shift register 90, which has a length of 960 storage stages. A first output of the shift register connects the 64th storage location with the node 94 (FIG. 9), which is linked to the input terminal of the first summing element 91. The circuit element 97, which is connected to the output terminal of the first summing element 9, is clocked with a clock frequency of, for example, T1=4 KHz. Accordingly, every 250 microseconds, average values of the last 64 transmitted pulses (corresponding to one millisecond) are generated by the summing element 91. Accordingly, a (6-bit-) signal quantized in 64 steps is active at the connecting point 97' of the circuit (FIG. 9) and can be further processed by the microcomputer 86*b*. This signal is shown as a curve 7 in FIG. 12 and represents by approximation the output signal emitted by the acceleration-sensitive sensor 80, thus an acceleration, which is characterized by high-frequency signal components.

A second output terminal of the shift register 90 is connected to the node 95 and to the input terminal of a second summing element 92: The circuit element 92 connected to the output terminal of the summing element 92 is clocked by the microcomputer 86*b* with a clock frequency of, for example, 2 KHz. Accordingly, an output signal that represents the average value over the last 192 transmitted pulses (corresponding to a transmission duration of about 3 milliseconds) is available at the circuit point 98', which is quantized in 192 steps (corresponds to about 8 bits) and is queried every 500 microseconds.

Figure 13:
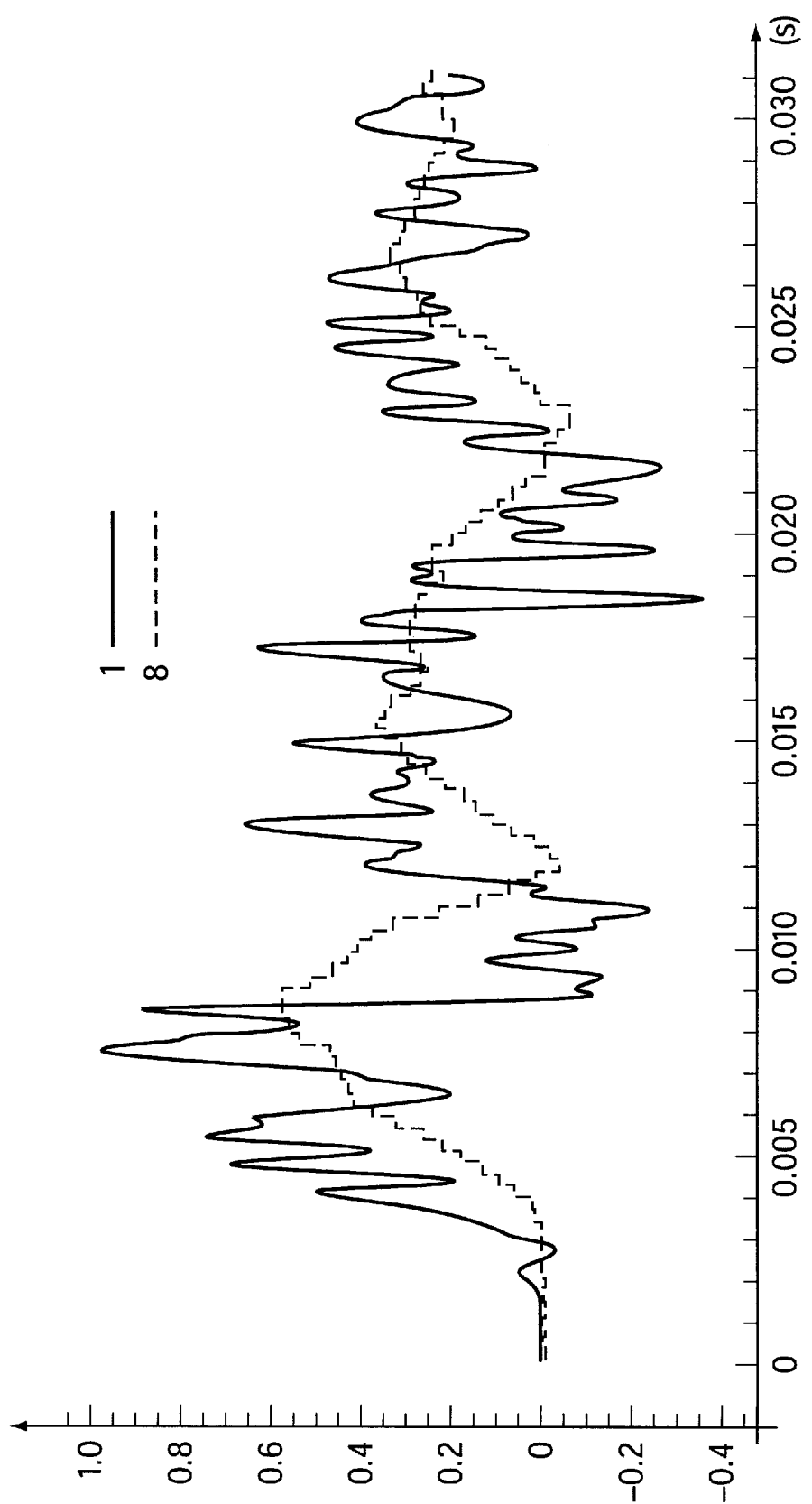
FIG. 13 shows a fourth graph of output signals as a function of time according to the present invention.
Figure 14:
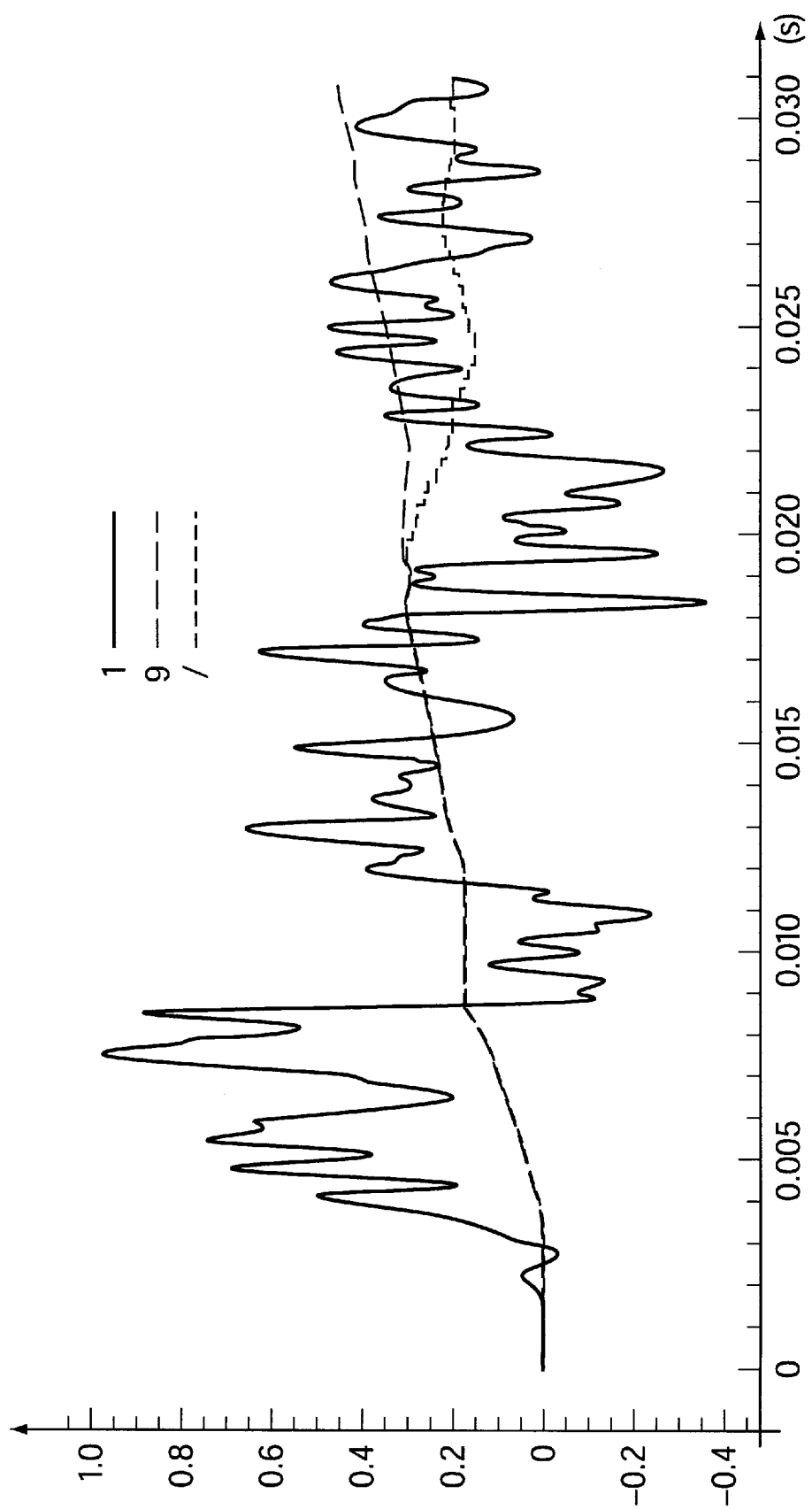
FIG. 14 shows a fifth graph of output signals as a function of time according to the present invention.

Finally, a third output of the shift register 90 is linked to the node 96 and to the input terminal of the summing element 93. The circuit element connected to the output terminal 93 of the summing element 93 is clocked with a clock frequency of, for example, 1 KHz. As a result, a quantized output signal, which is quantized in 960 steps (corresponds to about 10 bits) and represents an average value over the last transmitted 960 pulses (corresponding to a transmission time of 15 milliseconds), is produced every 1000 microseconds at the circuit point 99'. The output signals active at the circuit points 98', or 99' are shown in FIG. 13 (curve 8) and FIG. 14 (curve 9). As already mentioned above, the output signals active at the circuit points 97', 98', 99' can be further processed by the microcomputer 86*b*. To this end, these output signals are also expediently stored in the output registers, which are not shown specifically in the block diagram according to FIG. 9, for example, because they can also be a component of the microcomputer 86*b*.

It was described in the above by way of example how output signals from external or externally located sensors can be transmitted quite simply and free from interference to a centrally arranged control unit, in order to be further evaluated there. An especially simple and cost-effective transmission is rendered possible in that the acceleration-sensitive sensor 80 excited to produce natural oscillations makes available the system (internal) clock at the same time, with which the output signal from the sensor generated by the effects of acceleration is transmitted. Thus, a double function is obtained quite expediently. The performance reliability of the sensor 80 can be simply checked through excitation of oscillations. While a system clock for the signal transmission to the centrally arranged control unit 86 is derived from the oscillation frequency. A failure of the sensor 80 due to mechanical damage, for example, prevents the vibration operation and, in the final analysis, inappropriate output signals from being transmitted, so that the lack of operational reliability of the sensor 80 can be established at the same time.

Figure 15:
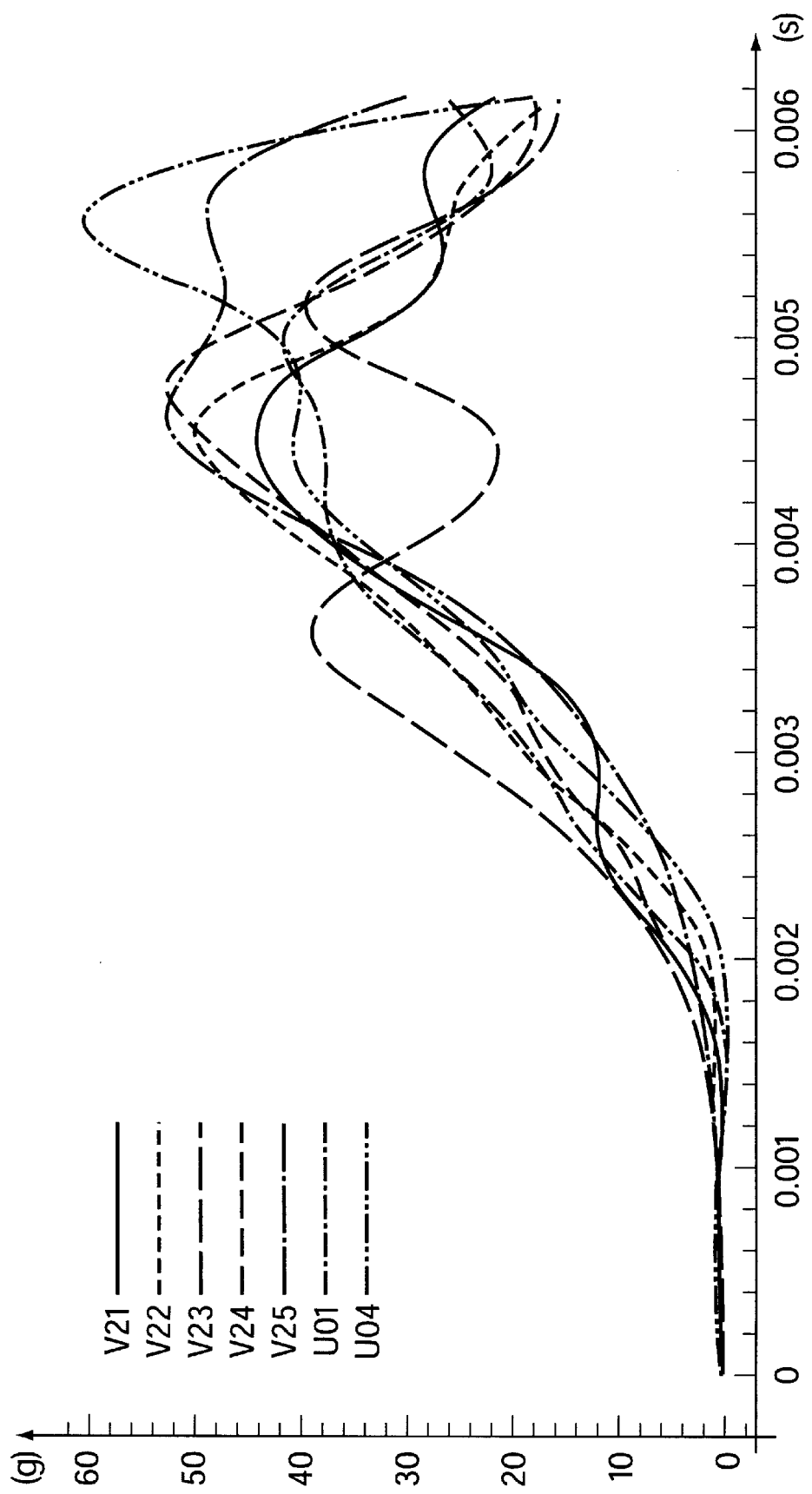
FIG. 15 shows a sixth graph of signal outputs as a function of time according to the present invention.

The further signal evaluation is performed quite expediently by the microcomputer 86*b* through the application of a specially designed detecting element (search filter), which makes it possible to rapidly detect a critical accident situation, particularly in the event of a side impact. As has already been mentioned above, the requirements to be fulfilled by the electronic device are extremely demanding. The time that is available to detect the critical occurrence of an accident is inordinately short because of the extremely small dimensions of the crash crumple zones provided in the side area of a vehicle. Thus, automotive manufacturers require, for example, that the electronic device must be able to reliably detect the occurrence of a critical accident before 5 milliseconds elapse. Unfortunately, since in the case of standard automotive designs of today nearly no characteristic output signals from the acceleration-sensitive sensor are available before expiration of about two milliseconds following the occurrence of an accident, there remains virtually a maximum of three milliseconds to make the necessary decision. FIG. 15 represents acceleration values measured during crash tests in a diagram as a function of time. A time interval of 6 milliseconds is displayed on the x-axis or time axis, while acceleration values of between 0 and 60 g (g=acceleration due to gravity) are plotted on the y-axis. The set of curves discernible in the diagram (curves U04, U01, V21, V22, V23, V24, V25) represents a total of seven crash tests, which were performed with a certain type of vehicle and at a collision speed of between 50 km/h and 60 km/h. The illustrated set of curves shows the characteristics already addressed. In the time interval between the beginning of the collision and about 2 milliseconds, the signals emitted by the acceleration-sensitive sensor are still very nondifferentiated, so that essentially no information about the type and severity of the accident can be obtained.

Figure 16:
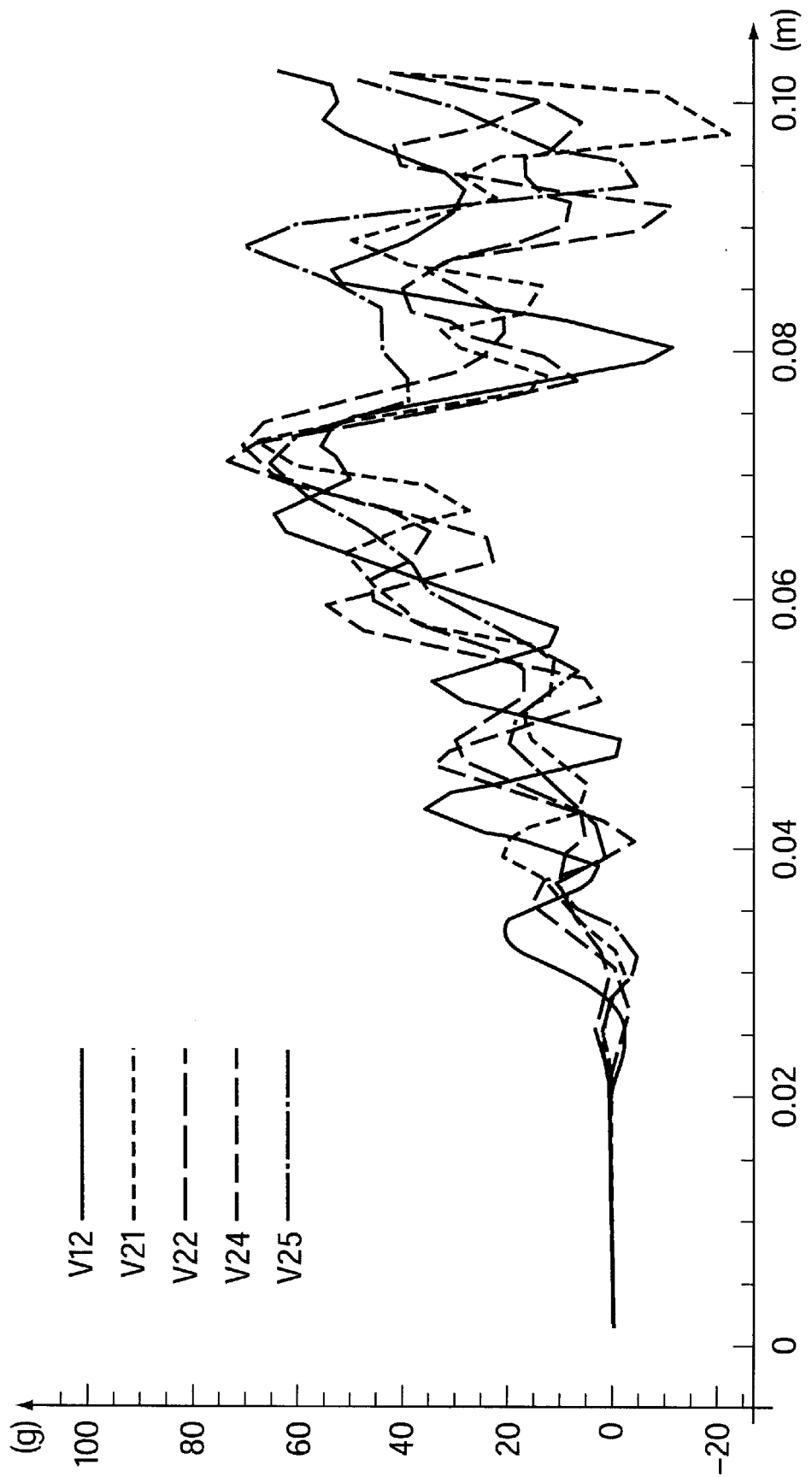
FIG. 16 shows a seventh graph of output signals as a function of time according to the present invention.

Between about 2 milliseconds and 5 milliseconds after the beginning of the accident, the depicted curves all show an essentially rising slope. If one additionally applies the acceleration as a function of the indentation path (intrusion), as shown in FIG. 16, then one sees that as of about 2 cm indentation depth, a structure is indented that gives way to about a 5 centimeter indentation path and, similarly to a spring, hereby indicates increasingly greater forces or accelerations. At an indentation depth of about 7 centimeters, a break in the structure occurs, which is discernible by the plunge in the illustrated acceleration signals. The results of these crash tests lead one to the conclusion that, at least as far as the measured acceleration curves are concerned, these curves are characteristic of a specific type of vehicle and are typical of the geometry and stiffness of the vehicle affected by the accident, so that characteristic properties of the accident occurrence can be derived from them. In practical applications, one is confronted with the problem of extracting this characteristic curve shape from the inevitably very noisy output signal of the acceleration-sensitive sensor and transmitting the properties of the curve shape that are typical of the way the accident happened with the least possible complexity, i.e., also in the narrowest possible band, to the remotely arranged control unit.

Figure 17:
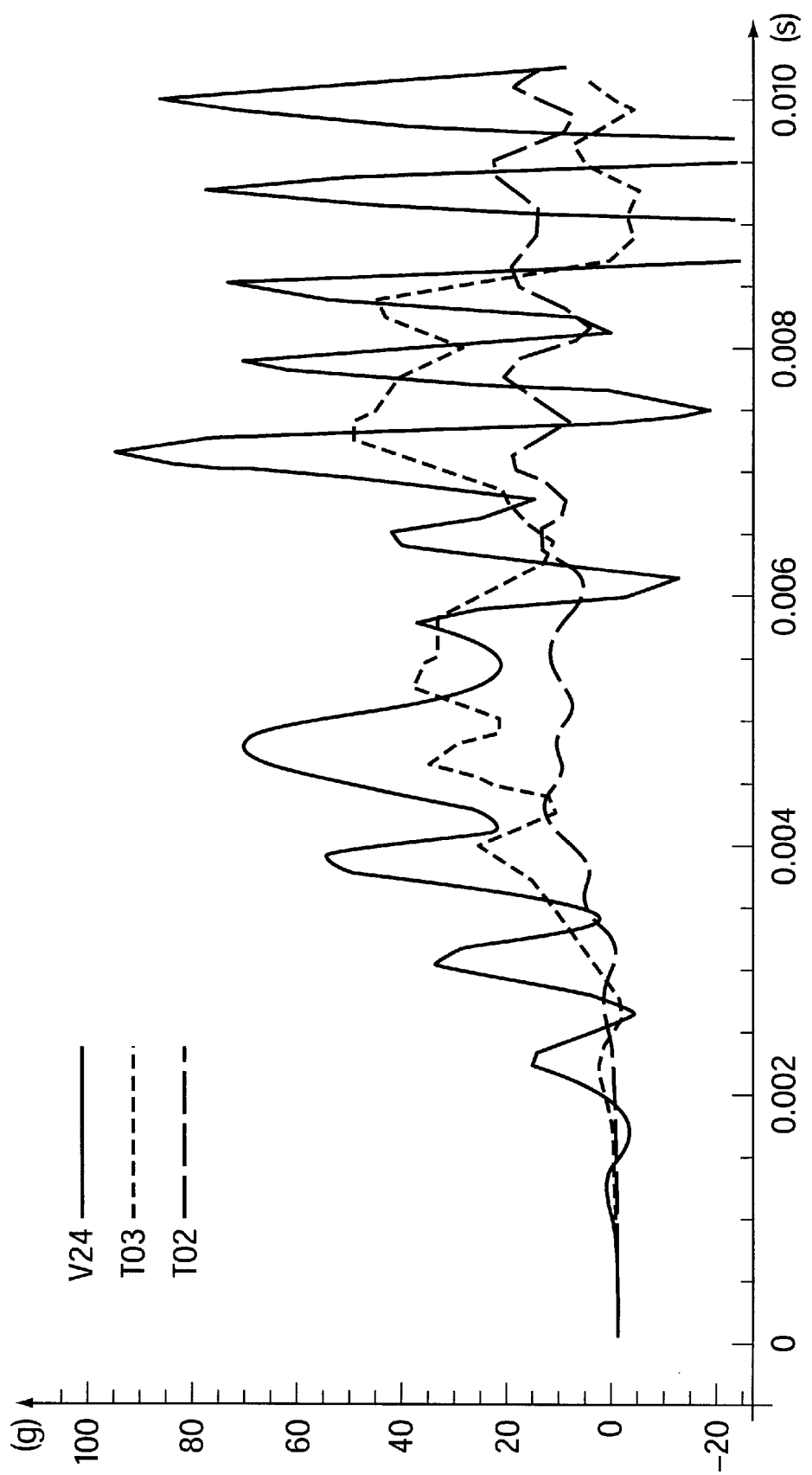
FIG. 17 shows an eighth graph of output signals as a function of time according to the present invention.
Figure 18:
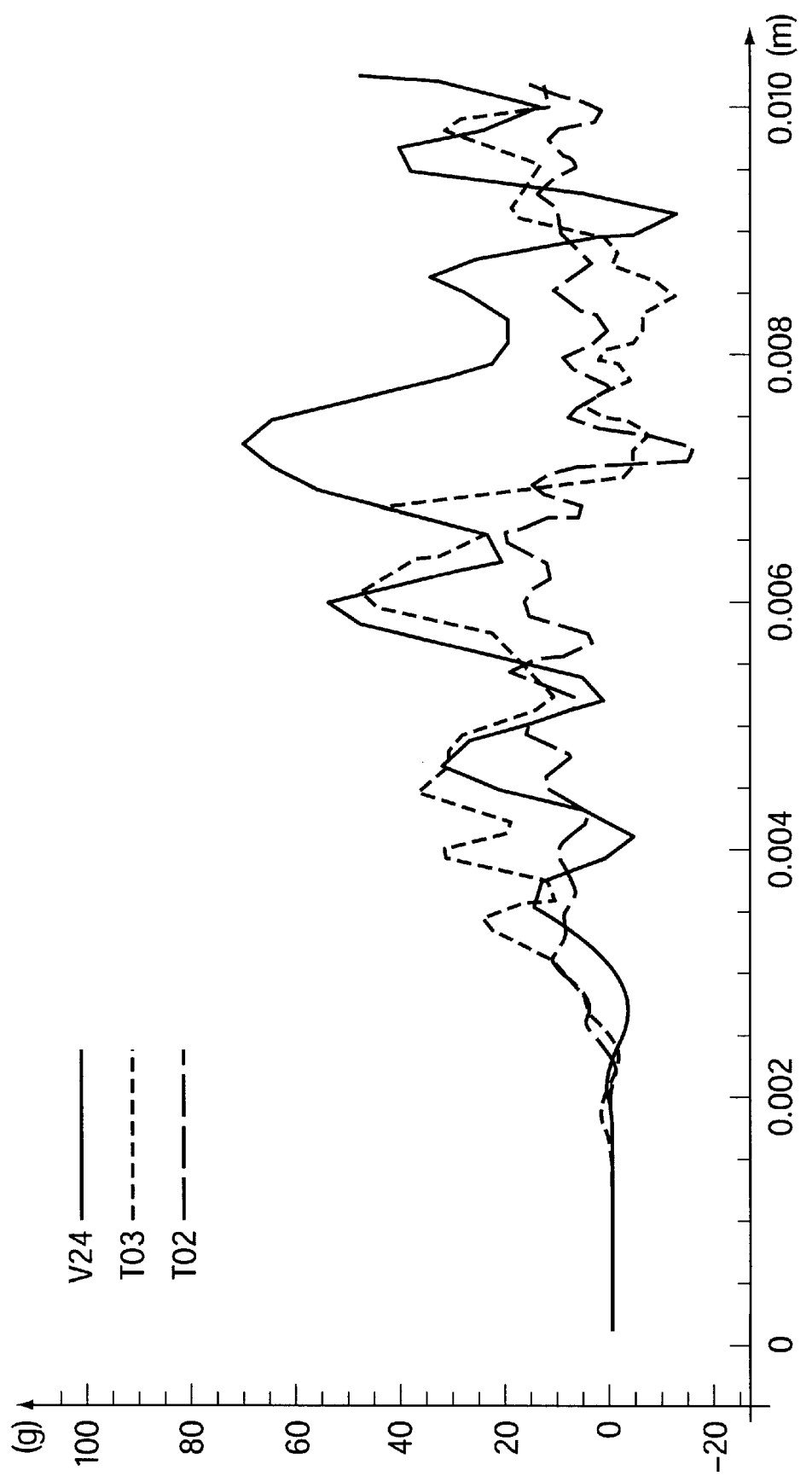
FIG. 18 shows a ninth graph of output signals as a function of time according to the present invention.
Figure 19:
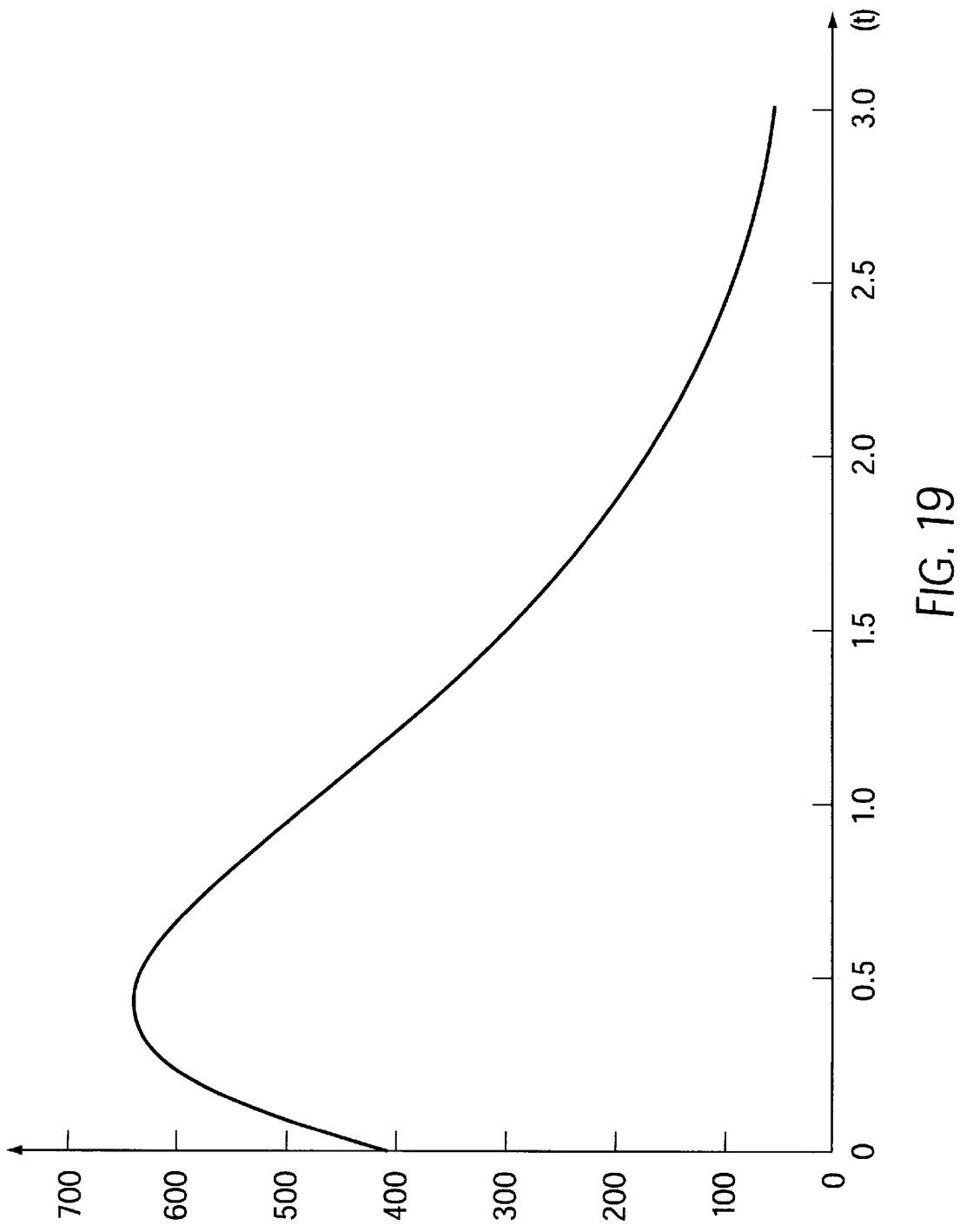
FIG. 19 shows a first filter characteristic curve according to the present invention.

Before going into how to solve this problem, the results of other crash tests performed on a specific type of vehicle will also be described to further clarify the situation. FIGS. 17 and 18 show additional crash test results, however, in contrast to the acceleration curves depicted in FIG. 15 and FIG. 16, these results were obtained at different impact speeds of the vehicle involved in the collision. The acceleration is depicted as a function of time in FIG. 17, while the acceleration is represented in dependence upon the indentation depth (intrusion) in FIG. 18. Both figures show three curves which are assigned to different impact speeds. The curve V 24 corresponds in this case to an impact at a speed of about 55 km/h, at which the airbag is activated after about 5 milliseconds. The curve T03 corresponds to an impact at a speed of 30 km/h and an activation of the airbag in the time interval of between about 5 and 10 milliseconds. Finally, curve T02 corresponds to an impact at a speed of about 25 km/h, which did not lead to the airbag being released. These curves reveal a profile that is characteristic of the vehicle type being tested, however, it is superposed by numerous high-frequency oscillation components. Before routing the output signal from the acceleration-sensitive sensor, it is expediently subjected to a filtering, which frees the useful signal from the interfering high-frequency components and also suppresses noise components. The pulse response of a second-order detecting element (search filter) suited for this purpose having PDT-2 performance characteristics (proportional, differentiating, 2nd-order low-pass) is depicted in FIG. 19. This figure shows relative amplitude values as a function of time. Such filter characteristics can be described, for example, by the following equation:

$$G(s) = V \frac{b_0 + b_1 s}{a_0 + a_1 s_2 + a_2 s^2}$$

where, for example, $b_0$=1.141.e
$b_1$=200
$a_0$=1.141e
$a_1$=1.375e
$a_2$=0.414
V=1

Figure 20:
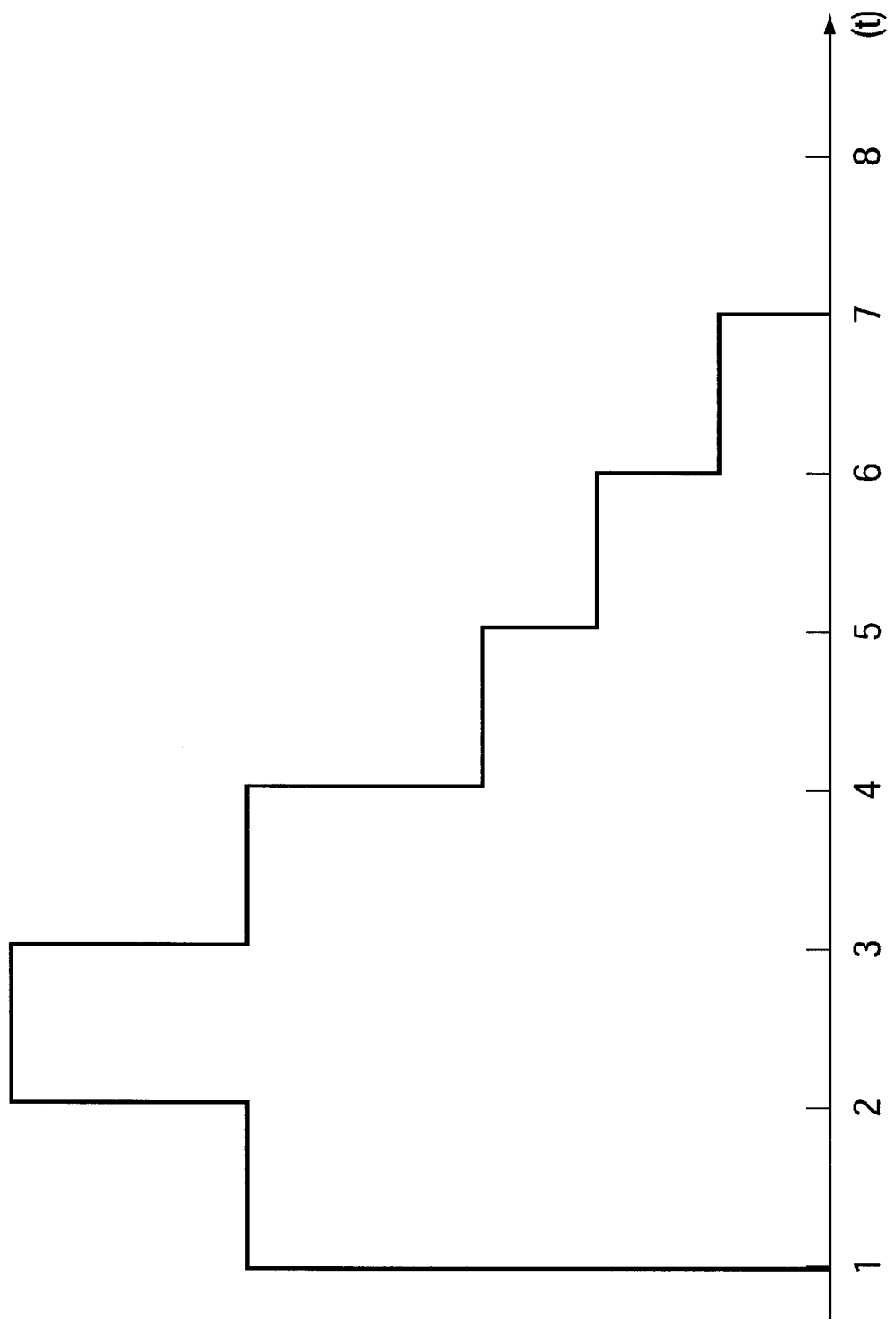
FIG. 20 shows a second filter characteristic curve according to the present invention.

Comparatively good results can also be achieved using a digital filter (6th-order FIR-filter) with a sampling of around 500 microseconds, whose pulse response is shown in FIG. 20. Such a filter curve can be expressed by approximation as follows:

$$y(k) = \frac{5}{23}u(k) + \frac{7}{23}u(k) + \frac{5}{23}u(k-2) + \frac{3}{23}u(k-3)\frac{2}{23}u(k-4) + \frac{1}{23}u(k-5)$$

y being the output, u the input to the clock pulse k.

Figure 21:
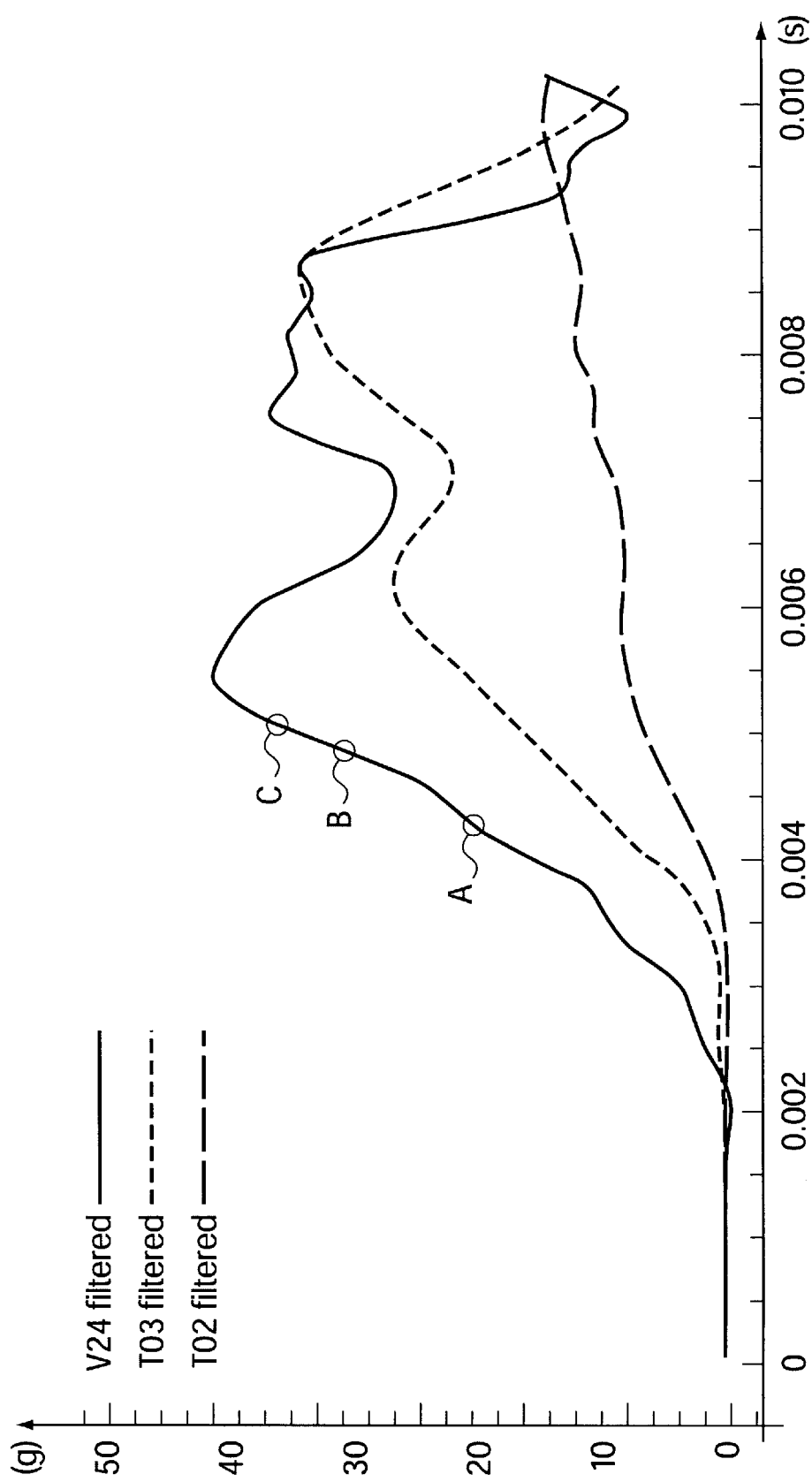
FIG. 21 shows a filtered acceleration signal as a function of time according to the present invention.
Figure 22:
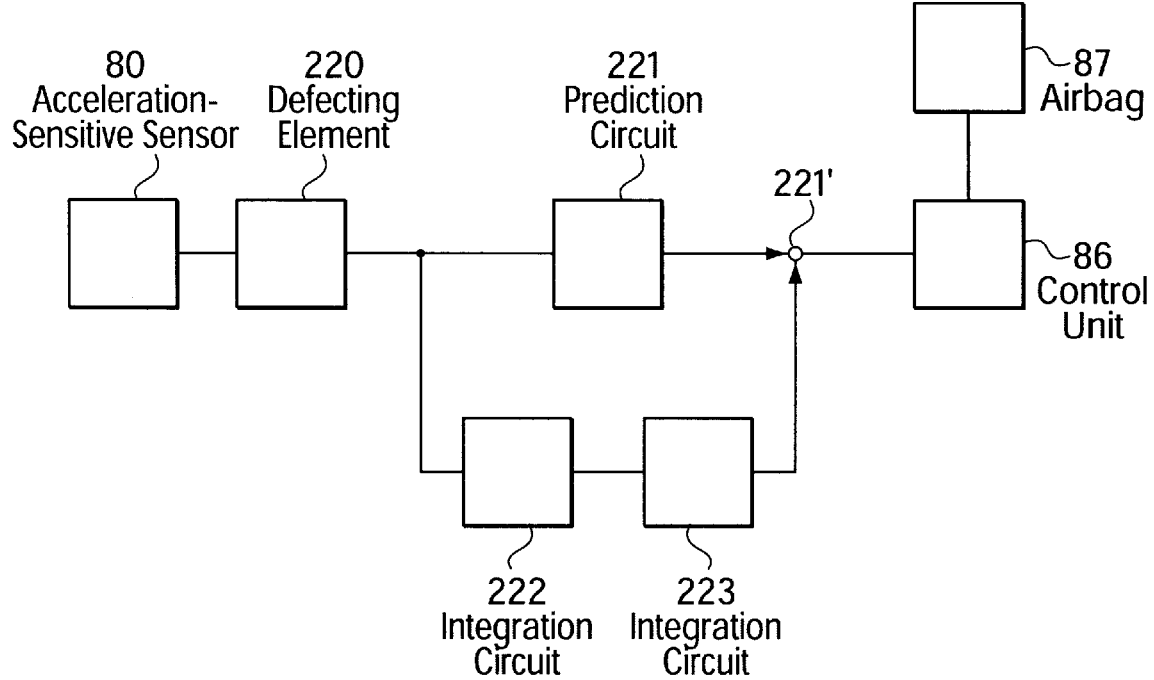
FIG. 22 shows a fifth circuit block diagram according to the present invention.

The effect that can be attained using the described filtering is shown in FIG. 21, which, in turn, shows the signal patterns known already from FIG. 17 and FIG. 18, but this time as filtered signals. The acceleration is shown as a function of time. The figure shows that superposed high-frequency interferences are nearly completely suppressed. The signal patterns of curves V24 and T03, which are, therefore, characteristic of the occurrence of a crash tend toward a maximum at the nominal tripping times, about 5 milliseconds for V24 between 6 and 10 milliseconds T03 and, as a result, show a large signal distance to the signal of the curve T02, which corresponds to a no tripping case. An electronic device having a design implementing the previously discussed features is shown in FIG. 22 in the form of a block diagram. It again includes an already known acceleration-sensitive sensor 80, to which a detecting element (search filter) 220 having a low-pass character is added downstream. The output terminal of the detecting element 220 is connected to the input terminal of a prediction circuit 221 and of an integration circuit 222, 223. The output terminals of the modules 221 and 223 are joined in a node 221', which is connected to the input terminal of the control unit 86 arranged remotely from the sensor 80. In the manner already described, the output terminal of the control unit 86 is linked to the input terminal of a safety device, in particular of an airbag 87. From the output signal of the sensor 80, which conveys the acceleration of the door components resulting from an impact, a quantity corresponding to the speed of the door is generated through integration by means of the integration circuit 222, 223. This quantity can still be superposed at the node 221' with a component of the measured acceleration through superposition with the output signal from the circuit 221 before this information is transmitted to the remote control unit 86. Only the dynamically considerably slower and less noisy speed of the door is still transmitted to this control unit 86 in the previously described manner, this speed representing a clearly defined quantity for activating the airbag system. Then there is a direct correlation between the speed of the door at the instant of impact experienced by the occupants and the seriousness of injuries. Since, as a rule, the free path between the door and the vehicle occupants is known, the necessity of releasing the airbag system can be derived already very early on from the rise in the speed of the door over time. As a rule, the door moves independently of the vehicle parts not directly affected by the accident. Thus, for example, in the case of a side impact at a speed of about 50 km/h, a door speed of more than 65 km/h is already measured at an instant when the vehicle affected by the accident was still at rest as a whole. Since the sensor signal is essentially conditioned by the previously described device depicted in FIG. 22 at the mounting location of the sensor, the transmission to the centrally arranged control unit 86 can be limited to a few important pieces of information. The amplitude values of the curves shown in FIG. 21 can be transmitted, for example, to the control unit 86 and be compared there to the specified threshold values. It can then be determined in the control unit 86, for example, at what instant specific threshold values of acceleration values or speed values (speed of the door) are reached. It can also be established in what sequence and time interval these specifiable threshold values are run through. This is clarified on the basis of FIG. 21. In conjunction with curve V24, which corresponds, as mentioned above, to an impact at about 54 km/h, three points (A, B, C) are marked, which conform with corresponding threshold values of acceleration, namely 20 g, 30 g and 35 g. Viewed as a time sequence, the threshold value A is reached after about 4 milliseconds, the threshold value B after about 4.8 milliseconds, and the threshold value C after about 5 milliseconds. In this case, the threshold value C characterizes that value, which prompts the control unit 86 to activate the airbag 87. From the sequence of these threshold values A, B, C, the control unit 86 can deduce that there is a sharply rising acceleration and that the threshold values are being run through in logical sequence. This points to the occurrence of a critical accident, which makes it necessary to activate the airbag, which, as already mentioned, is released about 5 milliseconds after the beginning of the accident. Furthermore, by sampling individual amplitude values of the acceleration curve, it is also possible to establish the slope angle of this curve, to compare this slope angle with an optionally stored limiting value, and to release the airbag system when the slope angle exceeds a specifiable limiting value. A steeply ascending curve likewise points to the critical occurrence of an accident.

Figure 23:
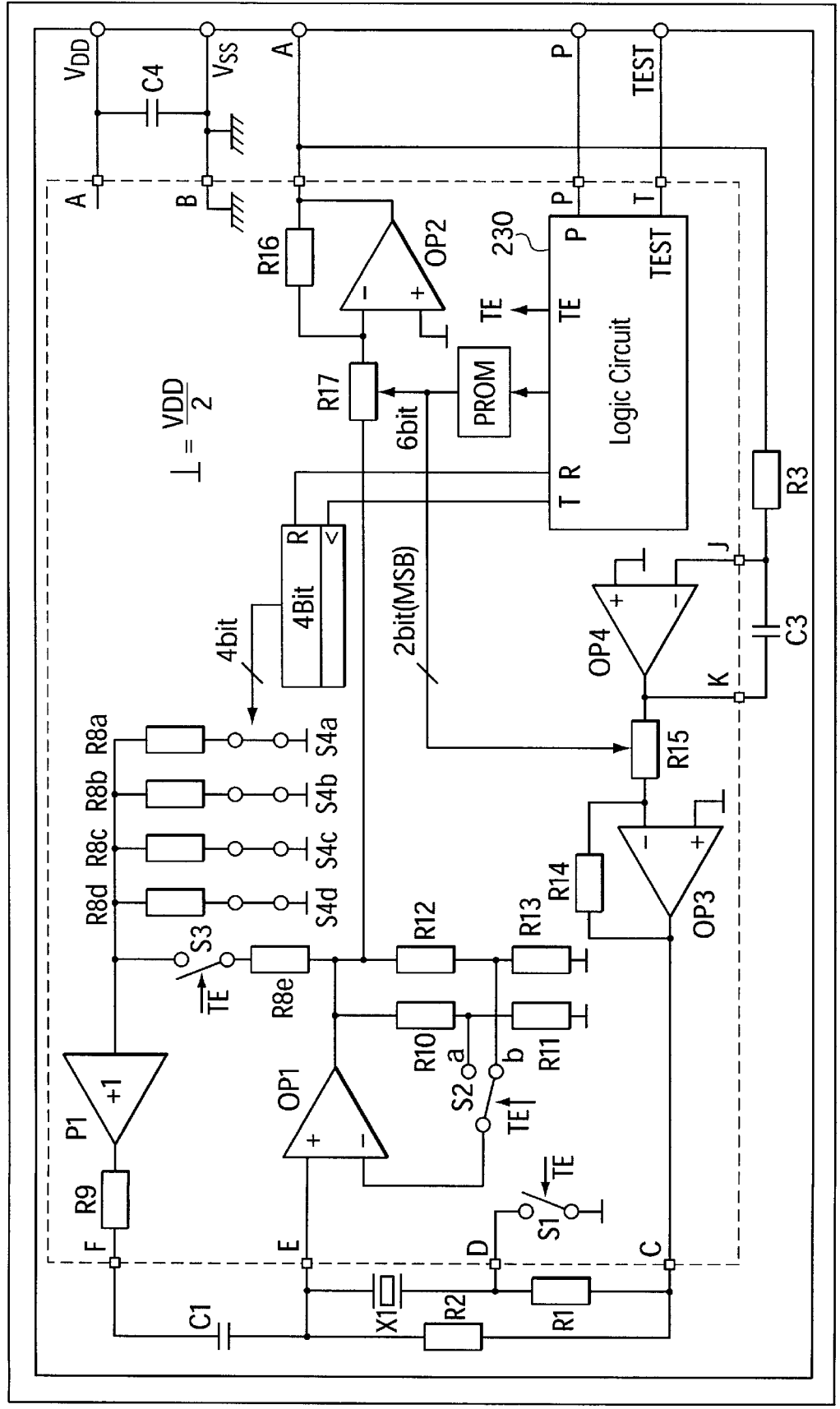
FIG. 23 shows a sixth circuit block diagram according to the present invention.

A sixth exemplary embodiment of the invention is shown in FIG. 23. The performance of the circuit arrangement shown in FIG. 23 is exceptionally reliable, since it works reliably over a broad temperature range and makes it possible to use sensors having relatively large tolerance ranges. A first connection terminal of a piezoelectric sensor (bimorph) X1 having two connection terminals leads to the circuit point E, which is connected to the non-inverting input terminal of a first operational amplifier OP1. The second connection terminal of the sensor X1 is connected to the circuit point D, which is linked, in turn, to a connection terminal of a circuit element S1, whose other connection terminal is grounded. The second connection terminal of the sensor X1 is also connected to a resistor R1, whose other connection terminal is linked to the circuit point C, which is connected to the output terminal of an operational amplifier OP3. Another resistor R2 is connected in parallel to the series circuit comprised of the sensor X1 and the resistor R1. The circuit point E is connected via a capacitor C1 to the circuit point F, which is connected via a resistor R9 to the output terminal of a buffer amplifier P1. Connected to the input terminal of the buffer amplifier P1 is the common connection terminal of a plurality of resistors R8a, R8b, R8c, R8d, the second connection terminal of each of these is connectible via circuit elements S4a, S4b, S4c, S4d to the grounded connection. Furthermore, the input terminal of the buffer amplifier P1 is linked via another circuit element S3 and a resistor R8e to the output terminal of the first operational amplifier OP1. Connected in parallel between this interconnection point and the grounded connection are two series circuits of two resistors each, R10, R11 and R12, R13, respectively. The middle tap of the series circuit comprised of resistors R10, R11 is connected to the switching connection a of a circuit element S2. The middle tap of the series circuit comprised of resistors R12, R13 is connected to the switching connection b of the circuit element S2. Another connection terminal of the circuit element S2 is linked to the inverting input terminal of the first operational amplifier OP1. The output terminal of the operational amplifier OP1 is connected via a rheostat R17 to the inverting input terminal of a second operational amplifier OP2, which serves as a calibration amplifier. The output terminal of the operational amplifier OP2 is connected via a resistor R16 to the inverting input terminal. The output terminal of the operational amplifier OP2 leads to the circuit point A. The non-inverting input terminal of the operational amplifier OP2 is linked to the grounded connection. The variable connection of the rheostat R17 is connected to the output terminal of a PROM, whose input terminal is linked, in turn, to a first output terminal of a logic circuit 230. The output terminal of the PROM is connected, in addition, to the variable connection of a second rheostat R15, whose output terminal is linked to the inverting input terminal of a third operational amplifier OP3, whose non-inverting input terminal is connected to the grounded connection. The output terminal of the operational amplifier OP3 is linked via a resistor R14 to the inverting input terminal. The output terminal of the operational amplifier OP3 is connected, in addition, to the circuit point C and to the connection between the resistors R1 and R2. The circuit point A is linked, in addition, via a resistor R3 to the inverting input terminal of another operational amplifier OP4, whose non-inverting input terminal is connected to ground. Furthermore, the inverting input terminal of the operational amplifier OP4 is linked via a capacitor C3 to its output terminal, which is also connected to a terminal of the variable resistor R15. The resistors R8a, R8b, R8c, R8d make up a switchable voltage divider, which is triggered by a 4-bit counter, which is triggered by the logic circuit 230.

The sensor X1 is used in two different methods of operation. When used as an acceleration sensor, the voltage is measured, which is produced in the case of a deformation resulting from the effect of force. In the self-test, the sensor is used as a frequency-determining component of an oscillator. However, in the oscillator operation, greater difficulties are encountered in practice when sensors X1 are used that have relatively large tolerance ranges. Two conditions must be fulfilled to force the circuit to vibrate in oscillator operation: the phase must be 0 and the closed-loop gain must be greater than 1. In addition, an upper limit applies for the closed-loop gain, as of which the frequency is no longer determined by the mechanical properties of the sensor X1, but rather predominantly by the capacitance and resistance conditions in the circuit. The circuit gets into a low-frequency relaxation (tilting) oscillation in the manner of an astable multivibrator. For applications in control units for airbag systems, one must arrange a passive low-pass filter upstream from the first active stage, and the critical frequency of this low-pass filter must lie in the order of magnitude of a few hundred hertz, typically less than or equal to three hundred hertz, and thus certainly so low that the resonant frequency of the oscillator circuit, which amounts in practice to 10 kilohertz, in particular between about 30 and 40 kilohertz, is completely suppressed. Therefore, the low-pass filter must be disconnectible for the test operation, thus in the vibrational state. Furthermore, at the relatively high oscillator frequency, the less than ideal properties of the operational amplifier come fully into play, namely the finite open-loop gain and the phase rotation. Both properties influence the closed-loop gain and the phase response (phase-frequency characteristic). In addition to this, the parameters of the operational amplifier depend heavily on the temperature. These less than ideal properties of the individual components of the circuit have the effect that, during test operation, the circuit does not build up oscillation with any sensor X1 at all and at any temperature at all, although the sensor X1 lies within specifiable, relatively broad tolerance values. However, the present circuit solves these problems in that it provides for a passive low-pass filter between the sensor and the input amplifier during measuring operation, a temperature compensation of the sensitivity during measuring operation, an adjustable closed-loop gain during test operation to cover any possible tolerances and, for safety reasons, a fixed gain during the measuring operation. In spite of all these features, it requires relatively few components, which to some extent are repeatedly utilized, which is beneficial for favorable pricing. In practice, it turns out that all tolerance problems can be offset by a closed-loop gain that is adjustable, for example, in 16 steps. To keep costs low, the gain is adjusted by the processor of the control unit. The test is considered as passed when the sensor X1 has oscillated with the known nominal frequency in at least one of the 16 possible amplification stages. The operating states, measuring operation and test operation, are explained in the following.

Measuring Operation:

All circuit elements are located in the position as drawn. The operating point of the circuit is adjusted with the resistor R2. The capacitor C1 is connected via R9 for the useful frequency at low-resistance to a reference potential and thus, together with the resistor R1, forms the passive low-pass filter, whose critical frequency, as already mentioned previously, amounts to a few hundred hertz. The measuring signal is amplified by the operational amplifier OP1 and then attains the calibration amplifier (operational amplifier OP2). Its gain is adjusted via the PROM so as to allow the nominal sensitivity to adjust itself at the output terminal A. Together with the capacitance of the sensor X1, the resistor R9 forms the lower critical frequency of the circuit arrangement, which amounts to less than 1 hertz. Because of the relatively high resistance value of the resistor R9, which amounts to a few hundred megohm, the input leakage current of the operational amplifier OP1 flowing through it produces an undesirable offset voltage, which can be compensated by an offset control loop consisting of the operational amplifiers OP3 and OP4. To compensate for an undesirable fluctuation of the lower critical frequency of the circuit arrangement, which is also substantially influenced by the gain of the operational amplifier 2 that is variable within a large range, if possible, the loop gain is kept at a constant value. This is simply achieved in that the gain of the operational amplifier OP3 is adjusted with the two most significant bits from the PROM so as to allow the product of the gains of the operational amplifier OP3 and of the operational amplifier OP2 to remain constant. For very small frequencies, the capacitor C1 is connected parallel to the sensor X1 and thus compensates for the sensitivity of the sensor X1 to temperature changes.

Figures 24A, 24B, 24C, 24D:
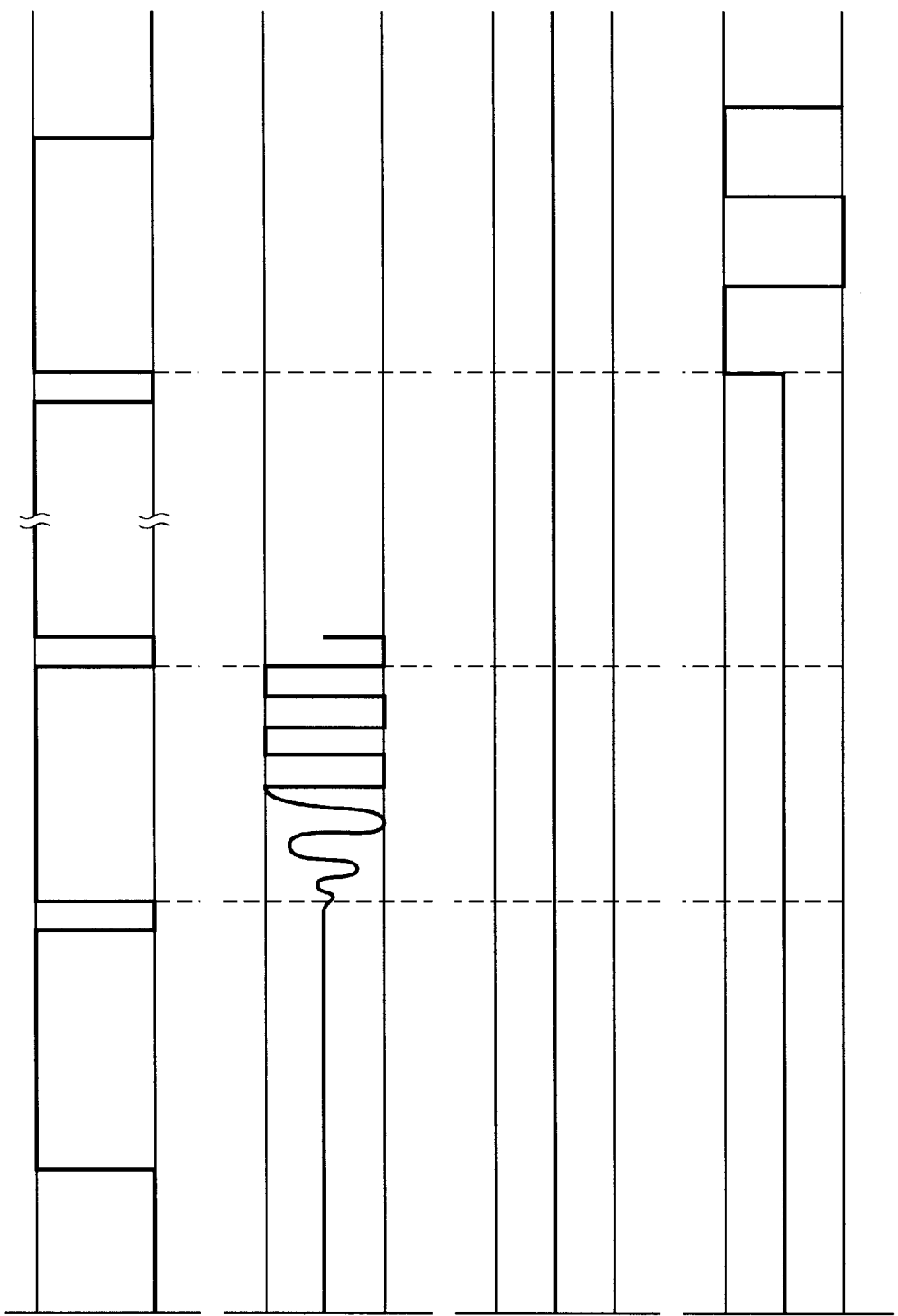
FIG. 24a shows a first signal output timing characteristic corresponding to the sixth circuit block diagram according to the present invention.
FIG. 24b shows a second signal output timing characteristic corresponding to the sixth circuit block diagram according to the present invention.
FIG. 24c shows a third signal output timing characteristic corresponding to the sixth circuit block diagram according to the present invention.
FIG. 24d shows a fourth signal output timing characteristic corresponding to the sixth circuit block diagram according to the present invention.

Test Operation:

The circuit elements S1, S3 are now closed. The circuit element S2 is situated in the switch operating position a. The 4-bit counter is reset, thus, the circuit elements S4a, S4b, S4c, S4d are likewise still closed. The resistor R1 is bridged by the circuit element S1. For that reason, the low-pass filter situated in the input area is no longer effective. Depending on the tolerance of the sensor X1, closed-loop gains in the order of magnitude of between about 2 and 8 are needed for the oscillation operation. The amplification range within which the circuit just starts to oscillate, but does not yet get into relaxation oscillation, lies between about 0.5 and 3. The gain required for this is adjusted via the switchable voltage dividers R8a, R8b, R8c, R8d, R8e. The circuit elements are triggered by a 4-bit counter. Consequently, the gain can be adjusted in 16 steps beginning from small values up to large values. When one runs through the entire range of values, the sensor X1 usually does not oscillate at all in the beginning, and then a few steps later at the nominal frequency. At the highest steps, it will even get into a relaxation oscillation. FIG. 24b shows the response by the sensor X1 to be able to guarantee oscillation build-up even given particularly unfavorable operating conditions, a higher gain is also still adjustable. These unfavorable operating conditions can occur because the open-loop gain of the operational amplifier 1 at the nominal frequency is already relatively low and temperature-dependent. To solve the problem, a much higher nominal gain of, for example, 12-times can be adjusted, so that effectively the factor 8 is at least attainable. However, this gain is too high for the measuring operation, so that a change-over from 8 to 12 is foreseen. The buffer amplifier P1 decouples the signal with high impedance and feeds it back via the resistor-capacitor combination R9/C1 to the input. The resistor R9 and the capacitor C1 serve in this case as phase shifters. Thus, the oscillator resonant circuit is closed. The oscillatory amplitude is, as a rule, so high, that the operational amplifiers limit. Therefore, a digital signal that can be conveniently evaluated by a processor is available at the output A. The circuit was designed to require only a minimal number of connection terminals. This was only able to be achieved by having a few lines with repeated assignments. The decoding required for this takes place in the logic circuit 230. The terminal P is used as a data input or programming voltage input during the calibration operation. The connection test is directly linked to the processor. During the measuring operation, it is connected directly to ground. The test operation is introduced by connecting the "TEST" terminal to the voltage VDD. The circuit starts to oscillate already when the tolerance conditions are favorable. When no oscillation is observed yet after approximately 50 milliseconds, the TEST terminal can be grounded for less than 10 microseconds. By this means, the closed-loop gain is raised to the next higher value. An oscillation build-up is subsequently expected again for a time period of 50 milliseconds. If the desired signal is observed, the TEST terminal is again grounded for at least 100 microseconds. This causes the 4-bit counter to be reset again. The reference voltage adjusts itself at the output of the buffer amplifier P1; the circuit is in measuring operation. The present circuit arrangement is distinguished, in particular, by the following properties. A mechanical self-test is possible. No additional components are needed for the test operation. Through a multiple use of the capacitor C1 as a low-pass filter, temperature compensator, phase shifter, and feedback element, comparatively few components are needed, which is beneficial for favorable pricing. The circuit arrangement is relatively insensitive to comparatively large tolerance deviations, in particular of the components sensor X1, operational amplifier OP1, capacitor C1, resistor R9, since such tolerances can be compensated for by an adjustable closed-loop gain. The closed-loop gain is adjusted by the processor by short pulses, thus through a multiple use of the TEST line. The low-pass filter is disconnectible by means of a circuit element arranged on the cold side of the sensor X1, through which means the circuit arrangement is insensitive to leakage currents.

What is claimed is:
1. An electronic device comprising:
   a resonant circuit including an acceleration-sensitive sensor, the acceleration-sensitive sensor being excited to vibrate at least during a testing phase of the acceleration-sensitive sensor; and an evaluation circuit coupled to the resonant circuit, the evaluation circuit determining a performance reliability of the acceleration-sensitive sensor.

2. The electronic device as set forth in claim 1, wherein the acceleration-sensitive sensor vibrates at a natural resonant frequency of the acceleration-sensitive sensor.

3. The electronic device as set forth in claim 1, wherein a vibration frequency of the acceleration-sensitive sensor is a multiple of a useful signal frequency of the acceleration-sensitive sensor.

4. The electronic device as set forth in claim 1, wherein a vibration frequency of the acceleration-sensitive sensor is in a frequency range of 10 KiloHertz to 50 KiloHertz.

5. The electronic device as set forth in claim 3, wherein the useful signal frequency of the acceleration-sensitive sensor is in a frequency range of 0 Hertz to 500 Hertz.

6. The electronic device as set forth in claim 1, wherein a vibration frequency of the acceleration-sensitive sensor is evaluated by the evaluation circuit to establish a frequency range of the resonant circuit including a resonant frequency of the acceleration-sensitive sensor.

7. The electronic device as set forth in claim 1, wherein the resonant circuit includes:

at least one low-pass filter having a critical frequency substantially below a vibration frequency of the acceleration-sensitive sensor, and a divider circuit dividing the vibration frequency of the acceleration-sensitive sensor, wherein at least the divided vibration frequency of the acceleration-sensitive sensor passes through the low-pass filter to the evaluation circuit.

8. An electronic device comprising:

a resonant circuit including an acceleration-sensitive sensor, the acceleration-sensitive sensor being excited to vibrate at least during a testing phase of the acceleration-sensitive sensor; and an evaluation circuit coupled to the resonant circuit, the evaluation circuit determining a performance reliability of the acceleration-sensitive sensor, wherein the resonant circuit includes:

at least one low-pass filter having a critical frequency substantially below a vibration frequency of the acceleration-sensitive sensor, and a divider circuit dividing the vibration frequency of the acceleration-sensitive sensor, wherein at least the divided vibration frequency of the acceleration-sensitive sensor passes through the low-pass filter to the evaluation circuit, and wherein the divider circuit includes a flip-flop triggered via a control signal of the evaluation circuit.

9. The electronic device as set forth in claim 1, wherein the evaluation circuit is controlled by a clock signal generated by the resonant circuit and determined as a function of a vibration frequency of the acceleration-sensitive sensor.

10. An electronic device comprising:

a resonant circuit including an acceleration-sensitive sensor, the acceleration-sensitive sensor being excited to vibrate at least during a testing phase of the acceleration-sensitive sensor; and an evaluation circuit coupled to the resonant circuit, the evaluation circuit determining a performance reliability of the acceleration-sensitive sensor, wherein the evaluation circuit is controlled by a clock signal generated by the resonant circuit and determined as a function of a vibration frequency of the acceleration-sensitive sensor, and wherein the resonant circuit generating the clock signal includes a clock-pulse divider stage having an input, the input receiving the vibration frequency of the acceleration-sensitive sensor, wherein the clock-pulse divider stage includes a monostable flip-flop, and wherein the vibration frequency is received via a pulse shaping stage.

11. The electronic device as set forth in claim 9, wherein the resonant circuit, generating the clock signal, further includes a clock-pulse multiplier stage.

12. The electronic device as set forth in claim 1, wherein the evaluation circuit includes:

a shift register having an input terminal and a plurality of output terminals;

a plurality of summing elements, each of the plurality of summing elements having an input terminal connected to a respective output terminal of the shift register and to the input terminal of the shift register, each of the plurality of summing elements having an output terminal; and a plurality of switching circuit elements, each of the plurality of switching circuit elements having an input terminal connected to the output terminal of a respective one of the plurality of summing elements.

13. The electronic device as set forth in claim 12, wherein the plurality of switching circuit elements are controlled via a microcomputer.

14. The electronic device as set forth in claim 1, wherein the acceleration-sensitive sensor is capable of operation for at least a predetermined duration as an accelerometer.

15. The electronic device as set forth in claim 1, wherein the resonant circuit has an adjustable closed-loop gain.

16. The electronic device as set forth in claim 15, wherein the adjustment of the closed-loop gain is effected by a switchable voltage divider, the voltage divider being triggered by a counter module, the counter module including a 4-bit counter.

17. The electronic device as set forth in claim 1, wherein the resonant circuit includes a capacitor as a component of a low-pass filter in a measuring operation, the capacitor also functioning in a test operation as a temperature compensator, a phase shifter, and a feedback element.

18. The electronic device as set forth in claim 11, wherein the clock-pulse multiplier stage includes a clock-pulse doubler stage.

* * * * *